US012183963B2

(12) United States Patent
Hollenbeck et al.

(10) Patent No.: US 12,183,963 B2
(45) Date of Patent: Dec. 31, 2024

(54) DEVICE COMPRISING A TRANSITION BETWEEN A WAVEGUIDE PORT AND TWO OR MORE COAXIAL WAVEGUIDES

(71) Applicant: Optisys, Inc., West Jordan, UT (US)

(72) Inventors: Michael Hollenbeck, West Jordan, UT (US); Robert Smith, West Jordan, UT (US)

(73) Assignee: Optisys, Inc., Salt Lake City, UT (US)

( * ) Notice: Subject to any disclaimer, the term of this patent is extended or adjusted under 35 U.S.C. 154(b) by 33 days.

(21) Appl. No.: 17/505,572

(22) Filed: Oct. 19, 2021

(65) Prior Publication Data

US 2022/0123477 A1 Apr. 21, 2022

Related U.S. Application Data

(60) Provisional application No. 63/093,610, filed on Oct. 19, 2020.

(51) Int. Cl.
*H01P 5/12* (2006.01)
*H01P 3/123* (2006.01)
*H01P 5/103* (2006.01)
*H01Q 21/00* (2006.01)

(52) U.S. Cl.
CPC ............. *H01P 5/12* (2013.01); *H01P 3/123* (2013.01); *H01P 5/103* (2013.01); *H01Q 21/0037* (2013.01)

(58) Field of Classification Search
CPC .................................... H01P 5/12; H01P 5/103
USPC ........................................................ 333/125
See application file for complete search history.

(56) References Cited

U.S. PATENT DOCUMENTS

| | | | | | |
|---|---|---|---|---|---|
| 2,819,451 | A | * | 1/1958 | Sims | H01P 1/16 |
| | | | | | 333/249 |
| 3,286,202 | A | * | 11/1966 | Daveau | H01Q 1/24 |
| | | | | | 333/108 |
| 3,432,716 | A | * | 3/1969 | Suzuki et al. | H01P 5/08 |
| | | | | | 315/39 |
| 3,777,286 | A | | 12/1973 | Cramm et al. | |

(Continued)

FOREIGN PATENT DOCUMENTS

EP 3093921 A1 11/2016
FR 3087954 A1 10/2018
(Continued)

OTHER PUBLICATIONS

Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.

(Continued)

*Primary Examiner* — Benny T Lee
(74) *Attorney, Agent, or Firm* — Terrence J. Edwards; TechLaw Ventures, PLLC

(57) ABSTRACT

Improved waveguides, transitions, and conductors for propagating electromagnetic energy. A device includes a waveguide port, two or more coaxial waveguides, and a transition disposed between the waveguide port and the two or more coaxial waveguides. The transition combines or divides electromagnetic energy propagating between the waveguide port and the two or more coaxial waveguides.

21 Claims, 15 Drawing Sheets

(56) References Cited

U.S. PATENT DOCUMENTS

| | | |
|---|---|---|
| 4,297,658 A | 10/1981 | Treczka |
| 4,467,294 A | 8/1984 | Janky et al. |
| 4,473,828 A | 9/1984 | Morz et al. |
| 4,504,805 A | 3/1985 | Ekelman, Jr. et al. |
| 4,743,915 A | 5/1988 | Rammos et al. |
| 4,783,663 A | 11/1988 | Rammos et al. |
| 4,952,894 A | 8/1990 | Connerney et al. |
| 5,243,357 A | 9/1993 | Koike et al. |
| 5,274,839 A | 12/1993 | Kularajah et al. |
| 5,291,650 A | 3/1994 | Carvalho et al. |
| 5,329,285 A | 7/1994 | McCandless |
| 6,018,315 A | 1/2000 | Ince et al. |
| 6,137,450 A | 10/2000 | Bhattacharyya et al. |
| 6,198,730 B1 | 3/2001 | Hogberg et al. |
| 6,201,508 B1 | 3/2001 | Metzen et al. |
| 6,211,813 B1 | 4/2001 | Dousset et al. |
| 6,297,774 B1 | 10/2001 | Chung |
| 6,356,241 B1 | 3/2002 | Jaeger et al. |
| 6,411,174 B1 | 6/2002 | Crouch et al. |
| 6,501,434 B1 | 12/2002 | Hollenstein et al. |
| 6,563,398 B1 | 5/2003 | Wu |
| 6,839,029 B2 | 1/2005 | Mendolia et al. |
| 7,480,435 B2 | 1/2009 | Brist et al. |
| 7,564,421 B1 | 7/2009 | Edwards et al. |
| 7,750,763 B2 | 7/2010 | Peter et al. |
| 8,537,068 B2 | 9/2013 | Martin et al. |
| 8,988,294 B2 | 3/2015 | Voss et al. |
| 9,065,163 B1 | 6/2015 | Wu et al. |
| 9,112,255 B1 | 8/2015 | Hollenbeck et al. |
| 9,142,872 B1 | 9/2015 | Izadian |
| 9,253,925 B1 | 2/2016 | Smith |
| 9,257,753 B2 | 2/2016 | Milroy et al. |
| 9,343,795 B1 | 5/2016 | Halligan et al. |
| 9,369,259 B2 | 6/2016 | Mohamadi |
| 9,450,308 B1 | 9/2016 | Lewis, Jr. |
| 9,537,212 B2 | 1/2017 | Rosen et al. |
| 9,559,428 B1 | 1/2017 | Jensen et al. |
| 9,728,862 B2 | 8/2017 | Choi et al. |
| 9,742,069 B1 | 8/2017 | Hollenbeck et al. |
| 9,859,597 B2 | 1/2018 | Jensen et al. |
| 9,960,495 B1 | 5/2018 | Hollenbeck et al. |
| 10,020,554 B2 | 7/2018 | Parekh et al. |
| 10,027,030 B2 | 7/2018 | Boryssenko et al. |
| 10,170,833 B1 | 1/2019 | Hollenbeck et al. |
| 10,181,645 B1 | 1/2019 | Klein et al. |
| 10,468,773 B2 | 11/2019 | Hollenbeck et al. |
| 10,481,253 B1 | 11/2019 | Hollenbeck et al. |
| 10,680,341 B1 | 6/2020 | Anderson et al. |
| 10,840,605 B2 | 11/2020 | Hollenbeck et al. |
| 11,128,034 B2 | 9/2021 | Hollenbeck et al. |
| 11,211,680 B2 | 12/2021 | Hollenbeck et al. |
| 11,233,304 B2 | 1/2022 | Hollenbeck et al. |
| 2003/0174096 A1 | 9/2003 | Mendolia et al. |
| 2004/0263290 A1* | 12/2004 | Sherrer et al. ............ H01P 1/08 333/243 |
| 2006/0226931 A1 | 10/2006 | Tavassoli Hozouri |
| 2008/0018420 A1 | 1/2008 | Prassmayer et al. |
| 2008/0308289 A1* | 12/2008 | Archambault et al. ... H01P 3/06 174/103 |
| 2009/0206473 A1 | 8/2009 | Lopez et al. |
| 2010/0033391 A1 | 2/2010 | McLean |
| 2010/0060391 A1 | 3/2010 | Ristola et al. |
| 2010/0141543 A1 | 6/2010 | Parekh |
| 2010/0188304 A1 | 7/2010 | Clymer et al. |
| 2010/0259346 A1 | 10/2010 | Runyon |
| 2011/0267250 A1 | 11/2011 | Seifried et al. |
| 2012/0025928 A1 | 2/2012 | Crouch |
| 2012/0062335 A1 | 3/2012 | Sherrer |
| 2013/0033404 A1 | 2/2013 | Abe |
| 2013/0141186 A1 | 6/2013 | Nguyen et al. |
| 2013/0154764 A1 | 6/2013 | Runyon |
| 2013/0241670 A1 | 9/2013 | Mikhemar et al. |
| 2013/0321089 A1 | 12/2013 | Ohashi et al. |
| 2014/0285291 A1 | 9/2014 | Payne et al. |
| 2014/0347144 A1 | 11/2014 | Nath et al. |
| 2015/0001762 A1 | 1/2015 | Lacaze et al. |
| 2015/0119045 A1 | 4/2015 | Montgomery et al. |
| 2015/0123862 A1 | 5/2015 | Milroy et al. |
| 2015/0123867 A1 | 5/2015 | Legay et al. |
| 2015/0130665 A1 | 5/2015 | Lacaze et al. |
| 2015/0180111 A1 | 6/2015 | Runyon et al. |
| 2015/0200462 A1 | 7/2015 | Leppaluoto |
| 2015/0229460 A1 | 8/2015 | Mohamadi |
| 2015/0270616 A1 | 9/2015 | Jafarlou et al. |
| 2015/0340752 A1 | 11/2015 | Nantista et al. |
| 2016/0036113 A1 | 2/2016 | Wu et al. |
| 2016/0141754 A1 | 5/2016 | Leyh et al. |
| 2016/0254579 A1 | 9/2016 | Mills |
| 2016/0351984 A1 | 12/2016 | Jensen et al. |
| 2017/0047661 A1 | 2/2017 | Parekh et al. |
| 2017/0077610 A1 | 3/2017 | Bongard et al. |
| 2017/0117637 A1 | 4/2017 | Jensen et al. |
| 2017/0256864 A1 | 9/2017 | Jensen et al. |
| 2017/0263991 A1 | 9/2017 | Jensen et al. |
| 2017/0302003 A1 | 10/2017 | Elsallal et al. |
| 2018/0090815 A1 | 3/2018 | Shirinfar et al. |
| 2018/0219277 A1 | 8/2018 | Hirata et al. |
| 2019/0089035 A1 | 3/2019 | Takahashi |
| 2019/0089058 A1 | 3/2019 | Klein et al. |
| 2019/0190111 A1 | 6/2019 | Hollenbeck et al. |
| 2019/0190160 A1 | 6/2019 | Hollenbeck et al. |
| 2019/0190161 A1 | 6/2019 | Hollenbeck et al. |
| 2019/0312327 A1 | 10/2019 | Kitt |
| 2019/0318848 A1 | 10/2019 | Gundel |
| 2019/0334252 A1 | 10/2019 | Adams et al. |
| 2020/0006865 A1 | 1/2020 | Adada et al. |
| 2020/0076066 A1 | 3/2020 | Hollenbeck et al. |
| 2020/0127358 A1 | 4/2020 | de Rijk et al. |
| 2020/0161738 A1 | 5/2020 | de Rijk et al. |
| 2020/0194855 A1 | 6/2020 | Hollenbeck et al. |
| 2020/0194860 A1 | 6/2020 | Hollenbeck et al. |
| 2020/0266510 A1 | 8/2020 | Menargues Gomez et al. |
| 2021/0013612 A1* | 1/2021 | Baldauf et al. ...... H01Q 9/0407 |
| 2021/0013623 A1 | 1/2021 | Wang |
| 2021/0111691 A1 | 4/2021 | Tiaotiao et al. |
| 2021/0126332 A1 | 4/2021 | Uemichi |
| 2022/0045420 A1 | 2/2022 | Hollenbeck et al. |
| 2022/0140477 A1 | 5/2022 | Hollenbeck et al. |
| 2022/0190456 A1 | 6/2022 | Hollenbeck et al. |
| 2022/0368000 A1 | 11/2022 | Hollenbeck et al. |
| 2022/0368026 A1 | 11/2022 | Hollenbeck et al. |

FOREIGN PATENT DOCUMENTS

| | | |
|---|---|---|
| GB | 2275454 B | 12/1997 |
| WO | 2017203568 A1 | 11/2017 |
| WO | WO 2017208153 A1 | 12/2017 |
| WO | WO 2019203902 A2 | 10/2019 |
| WO | WO 2019203903 A2 | 10/2019 |
| WO | WO 2019226201 A2 | 2/2020 |
| WO | WO 2020106774 A1 | 5/2020 |
| WO | WO 2022087027 A1 | 4/2022 |
| WO | WO 2022094325 A1 | 5/2022 |
| WO | WO 2022241483 A2 | 11/2022 |

OTHER PUBLICATIONS

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

English translation of WO 2017208153A1 prepared by Google Patents on Dec. 15, 2023 (https://patents.google.com/patent/WO2017208153A1/en?oq=WO+2017208153).

(56) References Cited

OTHER PUBLICATIONS

International Search Report and the Written Opinion of the International Search Authority dated Feb. 4, 2022 for International Application No. PCT/US21/55694.
International Search Report and the Written Opinion of the International Search Authority dated Feb. 3, 2022 for International Application No. PCT/US21/057428.
International Search Report and the Written Opinion of the International Search Authority dated Dec. 5, 2022 for International Application No. PCT/US21/72358.
N. Nathrath, et al. "Lightweight Intersatellitelink Antenna (LISA) operating at Ka-Band," Technical University of Munich, Institute of Astronautics, Munich, Germany, Published Apr. 12, 2010, Downloaded on Apr. 23, 2023 UTC from IEEE Xplore, 4 Pages.

* cited by examiner

DEVICE COMPRISING A TRANSITION BETWEEN A WAVEGUIDE PORT AND TWO OR MORE COAXIAL WAVEGUIDES

CROSS-REFERENCE TO RELATED APPLICATIONS

This application claims the benefits of U.S. Provisional Patent Application No. 63/093,610, filed Oct. 19, 2020, entitled "BROADBAND WAVEGUIDE TO DUAL-COAXIAL TRANSITION," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The disclosure relates generally to systems, methods, and devices related to antennas and specifically relates to waveguides and other elements of a broadband antenna array.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency by the speed of light $\lambda=c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high-performance applications exist for antennas that are less known outside the industry, such as electronic warfare and ISR (information, surveillance, and reconnaissance).

High-performance antennas are required when high data rate, long range, or high signal-to-noise ratios are required for a particular application. In order to improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources, including material properties (losses in dielectrics, conductivity in metals), total path length a signal must travel in the passive structure (total loss is loss per length multiplied by the total length), multi-piece fabrication, antenna geometry, and others. These losses are all related to specific design and fabrication choices that an antenna designer must make when balancing size, weight, power, and cost performance metrics (SWaP-C). The gain of an antenna structure is a function of the area of the antenna and the frequency of operation. To create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Every physical component is designed with the limitations of the fabrication method used to create the component. Antennas and RF components are particularly sensitive to fabrication method, as the majority of the critical features are inside the part, and very small changes in the geometry can lead to significant changes in antenna performance. Due to the limitations of traditional fabrication processes, hollow metal waveguide antennas and RF components are designed to be assembled as multi-piece assemblies, with a variety of flanges, interfaces, and seams forming the waveguide joints. All of these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide antennas and RF components in the realm of applications where size, weight, and cost are less important than overall performance.

One example of a component for waveguides is a transition between a coaxial waveguide input/output and a hollow waveguide. A "transition" is the region of the waveguide that converts the impedance or mode in one region of the waveguide to the impedance or mode of another region of the waveguide. In other words, an antenna, for example, transmitting an electromagnetic signal may provide the electromagnetic signal through a hollow waveguide into a transition where the electromagnetic signal is propagated in a hollow waveguide mode and converted into a coaxial waveguide mode propagating in a coaxial waveguide that is connected to the antenna. Likewise, an antenna receiving an electromagnetic signal may receive the electromagnetic signal from an antenna element connected to a coaxial waveguide which transitions to a hollow waveguide. The transitions serve an electromagnetic signal from a coaxial waveguide to a hollow waveguide or vice versa.

Accordingly, conventional hollow waveguides have been manufactured using conventional subtractive manufacturing techniques which limit specific implementations for waveguides to the standard rectangular, square, and circular cross-sectional geometries that have the limitations described above. Additive manufacturing techniques provide opportunities, such as integrating waveguide structures with other RF components such that a plurality of RF components may be formed in a smaller physical device with improved overall performance. However, the process of fabricating a traditional rectangular, square, or circular waveguide structure in additive manufacturing typically leads to suboptimal performance and increased total cost in integrated waveguide structures. Novel cross-sections for waveguide structures that take advantage of the strengths of additive manufacturing will allow for improved performance of antennas and RF components while reducing total cost for a complex assembly.

It is therefore one object of this disclosure to provide coaxial waveguide to hollow waveguide structures that may be optimally fabricated with three-dimensional printing techniques techniques (may also be referred to as "additive manufacturing techniques"). It is a further object of this disclosure to provide a coaxial waveguide transition to hollow waveguide structures that enables novel array geometries. It is a further object of this disclosure to provide a coaxial waveguide transition to hollow waveguide structure that integrates with other radio-frequency components.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
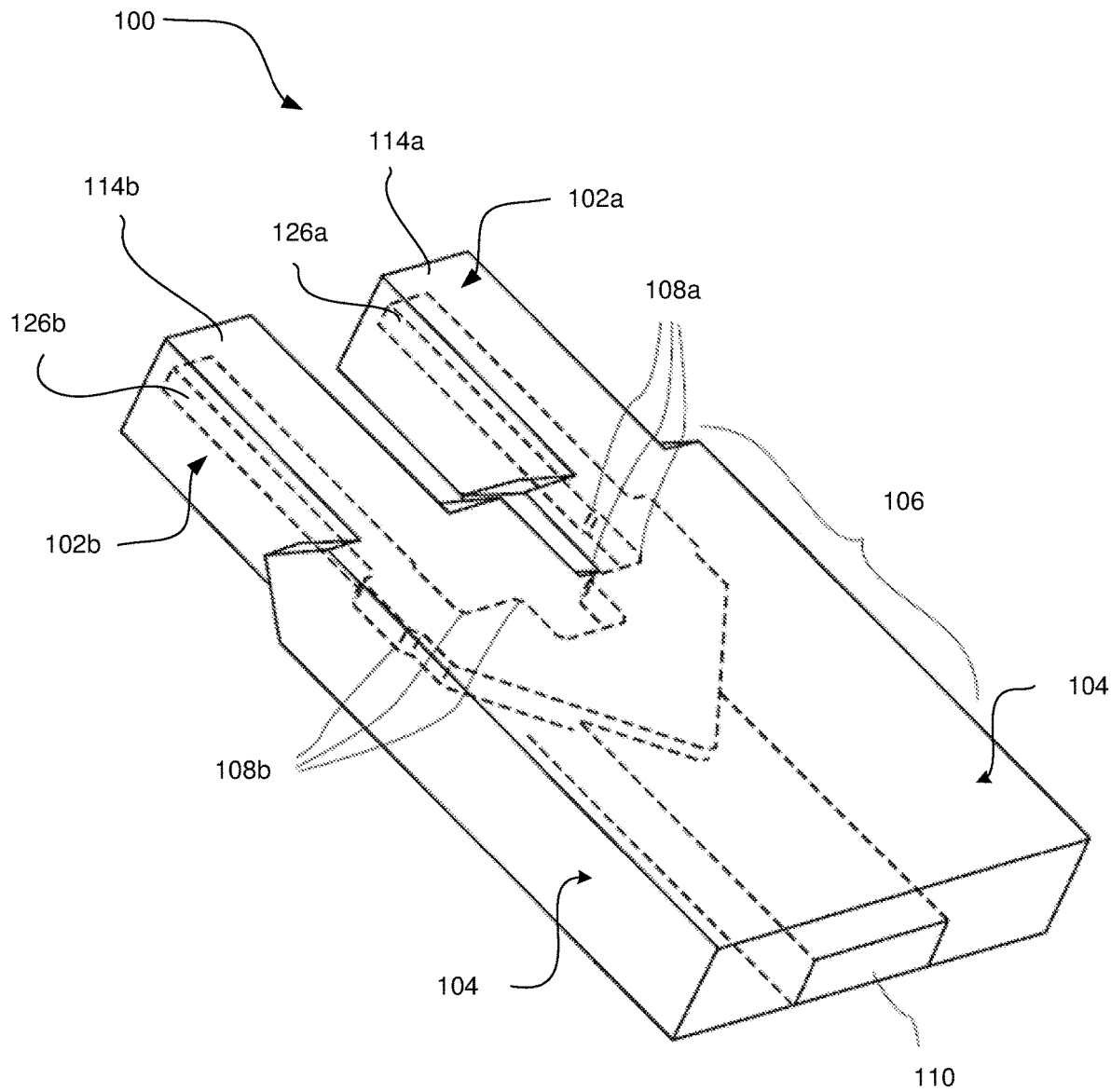
FIG. 1 illustrates a perspective view of a hollow single ridge waveguide to dual-coaxial waveguide transition.

Disclosed herein are improved systems, methods, and devices for communicating electromagnetic energy with waveguides. Specifically disclosed herein are improved transitions for combining or splitting electromagnetic energy moving between dual coaxial waveguide ports and a hollow waveguide port. A device disclosed herein includes a hollow waveguide port, two or more coaxial waveguide ports, and a transition disposed between the waveguide port and the two or more coaxial waveguide ports. The transition combines or divides electromagnetic energy depending on the direction of travel between the waveguide port and the two or more coaxial waveguide ports. The device may be constructed with metal additive manufacturing techniques (three-dimensional metal printing) and include a series of intricate impedance steps and tapers for transitioning impedance of the electromagnetic energy.

Embodiments described herein include improved configurations for a waveguide that can be implemented in an antenna. A waveguide includes a hollow enclosed space for carrying or propagating waves of electromagnetic radiation. In radio-frequency engineering and communications engineering, a waveguide is commonly a hollow metal pipe used to carry radio waves. The electromagnetic waves in a waveguide (which may include a metal pipe or other hollow space) may be imagined as travelling down the guide with a time-varying electric field that is oriented in a discrete set of configurations within the waveguide, dependent on frequency and geometry. Depending on the frequency, waveguides can be constructed of conductive or dielectric materials. Generally, the lower the frequency to be passed, the larger the waveguide. In practice, waveguides allow energy over a set of frequencies to move in both directions, similar to cables or PCB traces. For such applications, it is generally desired to operate waveguides with only one mode propagating through the waveguide, or a set of well-defined modes propagating through the waveguide.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Before the structure, systems, and methods for creating waveguide transitions are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "hollow ridged waveguide" and "hollow waveguide" broadly encompass waveguides that are single/dual ridge waveguides or waveguides without a ridge, any of which do not have a center conductor, as would be appropriate to a particular application known to those of ordinary skill in the art and those waveguides that are hollow in rectangular, circular, hexagonal, or other geometrical shapes. For example, where applications of the disclosure are specific to a particular waveguide type (e.g., a hollow waveguide vs. a coaxial waveguide vs. an optical waveguide) this disclosure refers to those particular waveguide types by name to differentiate "hollow ridge waveguides" and "hollow waveguides" from waveguides that may be coaxial waveguides, which have a center conductor and an outer conductor, or optical waveguides, which are generally made from a solid dielectric, or other different types and kinds of waveguides. However, a "waveguide" broadly refers to all waveguides of various types and kinds.

It is also noted that many of the figures discussed herein show air volumes of various implementations of waveguides, waveguide components, and/or waveguide transitions. In other words, these air volumes illustrate negative spaces of the components within a fabricated element which are created by a metal skin installed in the fabricated element, as appropriate to implement the functionality described. It is to be understood that positive structures that create the negative space shown by the various air volumes are disclosed by the air volumes, the positive structures including a metal skin and being formed using the additive manufacturing techniques disclosed herein.

For the purposes of this description, when referring to metal additive manufacturing, the direction of growth over time is called the "positive z-axis," or "zenith" while the opposite direction is the "negative z-axis," or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the "overhang angle," θ("theta").

The term "downward facing surface" is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: 0°≤θ≤90°. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

Referring now to the figures, FIG. 1 illustrates an isometric view of a device 100 comprising a single ridge waveguide 104 to dual coaxial waveguides 102a, 102b. The figures herein are illustrated such that the dotted lines represent solid components (may be constructed of metal), and non-dotted lines represent the outline of negative space. In FIG. 1, for example, the space between a dotted line and a non-dotted line represents the absence of an element and a negative space wherein air can pass through. This negative space may serve as a waveguide for propagating electromagnetic energy. The negative space may be defined by a metal structure or other solid component.

The device 100 includes, as a part of dual-coaxial waveguides, a first coaxial waveguide 102a, with inner conductor 126a and outer conductor 114a; and a second coaxial waveguide 102b, with inner conductor 126b and outer conductor 114b, which may each be connected via the inner conductors 126a, 126b to a coaxially-fed antenna array element. The coaxial waveguides 102a, 102b (may generally be referred to herein as coaxial waveguide 102 102) may be constructed of metal for conducting electromagnetic energy between the inner conductors 126a, 126b (may generally be referred to herein as inner conductor 126) and outer conductors 114a, 114b (may generally be referred to herein as outer conductor 114) in a TEM mode. The device 100 includes an impedance transition area 106 which serves to match the impedance of the hollow ridged waveguide 104 to the dual coaxial waveguides 102. The impedance transition area 106 may be referred to herein as a "transition."

The device includes a hollow waveguide 104 for propagating electromagnetic energy. The waveguide 104 represents negative space, or the absence of a structure wherein electromagnetic energy can travel in air, vacuum, or other non-conductive material. The transition 106 is configured for transitioning the electromagnetic energy from the hollow single ridge waveguide port 110, through the waveguide 104, and to the coaxial waveguides 102a, 102b. The coaxial waveguides 102a, 102b each include an inner conductor 126a, 126b and an outer conductor 114a, 114b. The electric field occupies the space between the inner conductor 126 and the outer conductor 114 with minimal penetration into either conductor such that only the electrons near the surface within some number of "skin depths" are excited to move by the field.

The transition 106 is an impedance transition and power combiner/divider region. The transition 106 converts a TE10 mode in the hollow single ridge waveguide to a transverse electromagnetic (TEM) mode in each of the dual coaxial waveguides. The transition 106 also acts as a power combiner or divider depending on which direction an electromagnetic wave is being propagated (e.g., being received or being transmitted). The impedance of the transition 106 may include impedance matching elements 108a and 108b which may include indents, outdents, steps with rounded corners, steps with corners which are disposed at an angle of 90° or less between adjoining faces of the step, and other features which serve to match the impedance of the transition 106 to a hollow ridged waveguide or to a coaxial waveguide. It is also to be noted that the impedance matching elements 108a and 108b may further be matched to each other on opposing sides of the transition (e.g., be symmetric or mirror images of each other).

The device 100 may further include a waveguide port 110 for the transition which may be a single ridge waveguide 104 in the example of FIG. 1. The device 100 may be connected to a host of other waveguide components for propagating an electromagnetic wave, including antennas, power combiners, power dividers, radiating elements, and others, for example. Other transitions, such as dual-ridge transitions are disclosed below. The device 100 may serve to match the impedance of an antenna, particularly a broadband antenna, at the radiating element of the array, with the impedance transition between a coaxial waveguide and a hollow waveguide through the impedance transition 106 using impedance elements 108a and 108b. As shown in FIG. 1, the device 100 may support a fundamental $TE_{10}$ mode of a hollow single ridge waveguide at waveguide port 110 and a TEM mode at each of the coaxial waveguide conductors. Further, the transition may connect coaxial waveguides 102a, 102b to a coaxial-fed antenna array element on one end of the device 100 and hollow waveguide corporate combiner network on another end, such as waveguide port 110 of the device 100.

It should also be noted that while the first coaxial waveguide 102a and the second coaxial waveguide 102b are shown as having a rectangular or square cross-sectional geometry, other geometries are possible, such as circular, elliptical, or multi-faceted polygon geometries, to adjust specific characteristics of the operation of the waveguide and interface with a coaxial-fed antenna array element.

Figure 2:
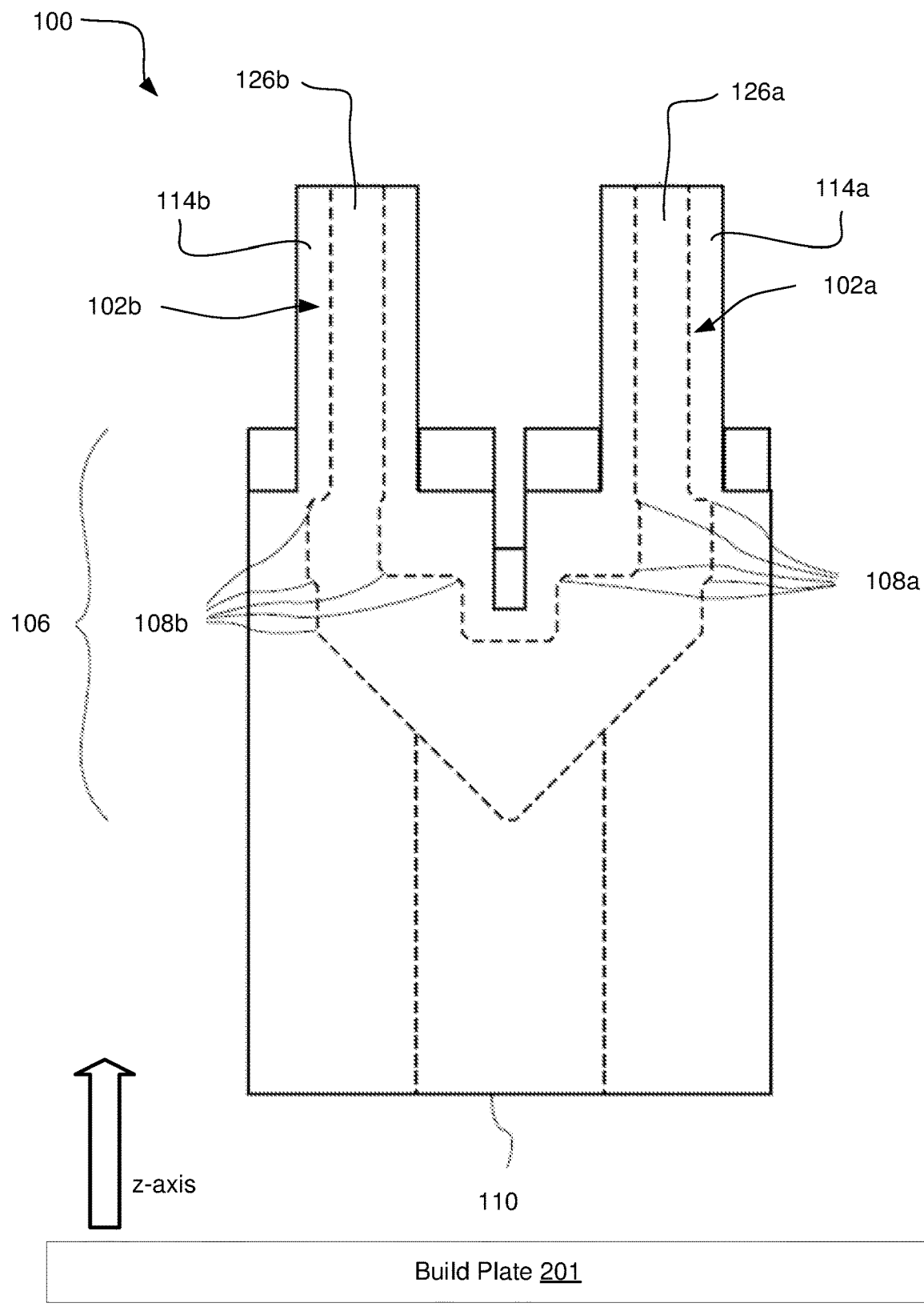
FIG. 2 illustrates a cross-sectional view of a hollow single ridge waveguide to dual-coaxial waveguide transition.

Finally, as discussed above, the device 100 may be made using metal additive manufacturing techniques (i.e., three-dimensional metal printing) which provide significant added benefit to the process of making the device 100. In some cases, metal additive manufacturing techniques allow the device 100 to be made where conventional techniques (such as CNC milling, for example) would be unable to replicate the shapes, sides, and construction of the device 100. The device 100 may be manufactured with metal additive manufacturing in a positive z-axis direction relative to a build plate, as shown in FIG. 2. In this case, the entire device 100, including the waveguide port 110, the coaxial waveguides 102a, 102b, the transition 106, the impedance elements 108a, 108b, the outer conductors 114a, 114b, and the inner conductors 126a, 126b, constitutes a single indivisible element manufactured with metal additive manufacturing, and further such that manufacturing of the device 100 does not require a separate joining process for joining separate components.

FIG. 2 illustrates a cross-sectional view of a device 100 comprising a single ridge waveguide to dual-coaxial waveguides 102a, 102b, also shown in FIG. 1. The device 100 may include a first coaxial waveguide 102a and a second coaxial waveguide 102b which may each be connected to a coaxial-fed antenna array element. Each of the coaxial waveguides 102a, 102b may be constructed of a metal or other conductive material. The transition may further include an impedance transition 106 which serves to match the impedance of the coaxial waveguides to other hollow waveguide components and to the coaxial input/output requirements. The transition 106 also acts as a power combiner or divider depending on which direction an electromagnetic wave is being propagated (e.g., being received or being transmitted). The impedance transition 106 may include impedance matching elements 108a and 108b which may include indents, outdents, steps with rounded corners, and other features which serve to match the impedance of the impedance transition 106 to a waveguide or to a coaxial input/output. It is also to be noted that impedance matching elements 108a and 108b may further be matched to each other on opposing sides of the transition (e.g., be symmetric or minor images of each other).

The device 100 may further include a hollow waveguide port 110 for the transition which may be a hollow single ridge waveguide in the example of FIG. 2. The device 100 may be connected to a host of other waveguide components for propagating an electromagnetic wave, including antennas, power combiners, power dividers, radiating elements, and others, for example. Other transitions, such as dual-ridge transitions are disclosed below. The transition may serve to match the impedance of an antenna, particularly a broadband antenna, at the radiating element of the array, with the impedance transition between a coaxial waveguide and a hollow waveguide through the impedance transition 106 using impedance elements 108a and 108b. As shown in FIG. 2, the transition may support a fundamental $TE_{10}$ mode in the hollow waveguide and a TEM mode in each of the coaxial waveguides.

The device may be constructed with metal additive manufacturing (i.e., metal three-dimensional printing). The device may be constructed upward relative to a build plate 201, wherein the z-axis for purposes of metal additive manufacturing is orthogonal to the plane of the build plate 201 as shown in FIG. 2. The device may be designed to ensure all overhang angles are oriented for an additive manufacturing process. The device 100 may be manufactured with metal additive manufacturing in a positive z-axis direction relative to a build plate, as shown in FIG. 2. In this case, the entire device 100, including the waveguide port 110, the coaxial waveguides 102a, 102b, the transition 106, the impedance elements 108a, 108b, the outer conductors 114a, 114b, and the inner conductors 126a, 126b, constitutes a single indivisible element manufactured with metal additive manufacturing, and further such that manufacturing of the device 100 does not require a separate joining process for joining separate components.

Figure 3:
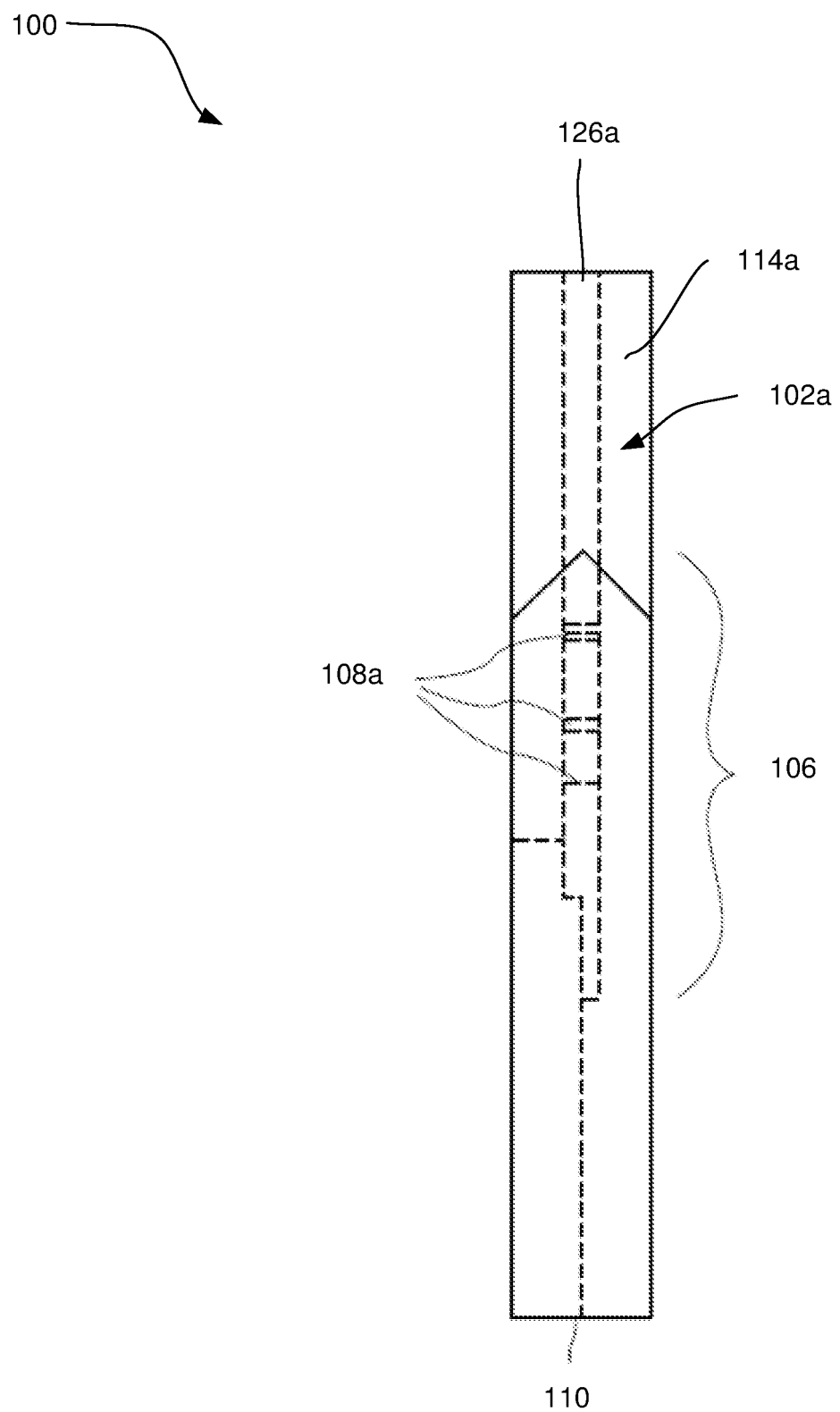
FIG. 3 illustrates a side view of a hollow single ridge waveguide to dual-coaxial waveguide transition.

FIG. 3 illustrates a side view of a device 100 comprising a single ridge waveguide to dual-coaxial waveguides, also shown in FIG. 1 and FIG. 2. The device 100 may include a first coaxial waveguide 102a and a second coaxial waveguide 102b (shown in FIG. 1 and FIG. 2 and not shown in FIG. 3 due to perspective) which may each be connected to a coaxial-fed antenna array element. The first coaxial waveguide 102a includes an inner conductor 126a and an outer conductor 114a.

The device 100 may further include an impedance transition 106 which serves to match the impedance of the hollow waveguide to other waveguide components and to the coaxial waveguide. The transition 106 also acts as a power combiner or divider depending on which direction an electromagnetic wave is being propagated (e.g., being received or being transmitted). The impedance transition 106 may include impedance matching elements 108a and 108b (108b shown in FIG. 1 and FIG. 2 and not shown in FIG. 3 due to perspective) which may include indents, outdents, steps with rounded corners, and other features which serve to match the impedance of the impedance transition 106 to a hollow waveguide or to a coaxial waveguide. It is also to be noted that impedance matching elements 108a and 108b may further be matched to each other on opposing sides of the transition (e.g., be symmetric or mirror images of each other).

The device 100 may further include a hollow waveguide port 110 for the transition which may be a hollow single ridge waveguide in the example of FIG. 3. The transition may be connected to a host of other waveguide components for propagating an electromagnetic wave, including antennas, power combiners, power dividers, radiating elements, and others, for example. Other transitions, such as dual-ridge transitions are disclosed below. The transition may serve to match the impedance of an antenna, particularly a broadband antenna, at the radiating element of the array, with the impedance transition between a coaxial waveguide and a hollow waveguide through the impedance transition 106 using impedance elements 108a and 108b. As shown in FIG. 3, the transition may support a fundamental $TE_{10}$ mode of a hollow waveguide and a TEM mode of a coaxial waveguide.

Figure 4:
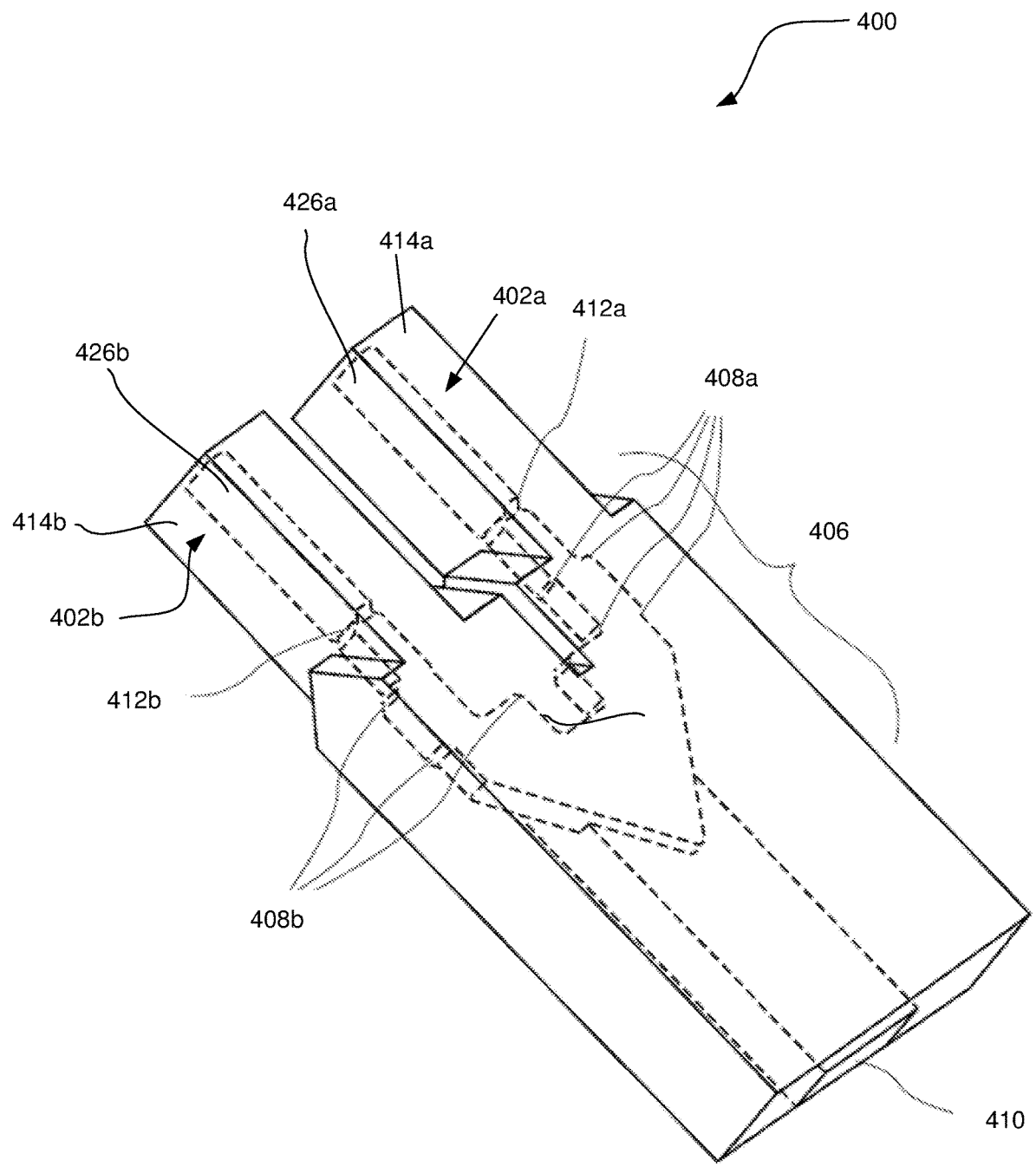
FIG. 4 illustrates a perspective view of a hollow single ridge waveguide to dual-coaxial transition with a rotated impedance transition.

FIG. 4 illustrates an isometric view of a device 400 comprising a single ridge waveguide to dual-coaxial waveguide transition with a rotated coaxial center conductor at the coaxial waveguide ports. The device 400 illustrated in FIG. 4 is similar to the device 100 illustrated in FIGS. 1-3 but with the addition of the rotational offset of the waveguide, as discussed further herein.

The device 400 may include a first coaxial waveguide 402a and a second coaxial waveguide 402b which may each be connected to a coaxial-fed antenna array element. The device 400 may further include an impedance transition 406 which serves to match the impedance of the waveguide to other waveguide components and to the coaxial input/output requirements. The transition 406 also acts as a power combiner or divider depending on which direction an electromagnetic wave is being propagated (e.g., being received or being transmitted). The impedance transition 406 may include impedance matching elements 408a and 408b which may include indents, outdents, steps with rounded corners, and other features which serve to match the impedance of the impedance transition 406 to a waveguide or to a coaxial input/output. It is also to be noted that impedance matching elements 408a and 408b may further be matched to each other on opposing sides of the device 400 (e.g., be symmetric or mirror images of each other).

The device 400 may further include a hollow waveguide port 410 for the device 400 which may be a hollow single ridge waveguide in the example of FIG. 4. The device 400 may be connected to a host of other waveguide components for propagating an electromagnetic wave, including antennas, power combiners, power dividers, radiating elements, and others, for example. Other transitions, such as dual-ridge transitions are disclosed below. The device 400 may serve to match the impedance of an antenna, particularly a broadband antenna, at the radiating element of the array, with the impedance transition 406 between a coaxial waveguide and a hollow waveguide through the impedance transition 406 using impedance elements 408a and 408b. As shown in FIG. 4, the device 400 may support a fundamental $TE_{10}$ mode of a hollow waveguide and a TEM mode of a coaxial waveguide. As will be discussed below, a dual ridge waveguide may also support a $TE_{10}$ mode for a hollow waveguide. Further, the device 400 may connect coaxial waveguides 402a, 402b to a coaxial-fed antenna element on one end of the device 400 and additional hollow waveguide components on another end, such as waveguide port 410 of the device 400.

It should also be noted that while first coaxial waveguide 402a and second coaxial waveguide 402b are shown as being rectangular/square in cross-section, other cross-section geometries are possible, such as circular, or multi-faceted polygon geometries, to adjust specific characteristics of the operation of the waveguide and interface with a coaxial-fed antenna element.

As shown in FIG. 4, the device 400 includes a first coaxial waveguide 402a and a second coaxial waveguide 402b which include a rotational offset 412a, and 412b, respectively. The rotational offset 412a and the rotational offset 412b may allow the device 400 to operate in one of an E-plane and an H-plane of a radiating element or, alternatively, provide for an additional impedance change for correct impedance matching purposes. For example, the transition shown in FIG. 1 may be joined in a combiner network with the device 400, where the first coaxial waveguide 402a and second coaxial waveguide 402b are rotated 90 degrees from an orientation of first coaxial waveguide 102a and second coaxial waveguide 102b of the transition, allowing the transition to operate in an E-plane of a coaxially fed radiating element, for example, and the device 400 to operate in an H-plane of a coaxially fed radiating element, for example. The rotational offsets 412a and 412b provide a twist in the first coaxial waveguide 402a and the second coaxial waveguide 402b such that the metal conductor is continuous throughout the twist of the rotational offset 412a and 412b.

In an implementation, the rotational offsets 412a, 412b are implemented to ensure that the coaxial waveguides are offset 90-degrees relative to one another. In this implementation, the first coaxial waveguide 102a may be oriented orthogonal, or nearly orthogonal, to the second coaxial waveguide 102b.

Finally, as discussed above, the device 400 may be made using metal additive manufacturing techniques which provides significant added benefit to the process of making the device 400. In some cases, metal additive manufacturing techniques allows the device 400 to be made where conventional techniques (such as CNC milling, for example) would be unable to replicate the shapes, sides, and construction of the device 400. The device 400 may be manufactured with metal additive manufacturing in a positive z-axis direction relative to a build plate. In this case, the entire device 400, including at least the waveguide port 410, the coaxial waveguides 402a, 402b, the transition 406, the impedance elements 408a, 408b the outer conductors 414a, 414b, and the inner conductors 426a, 426b, constitutes a single indivisible element manufactured with metal additive manufacturing, and further such that manufacturing of the device 400 does not require a separate joining process for joining separate components.

Figure 5:
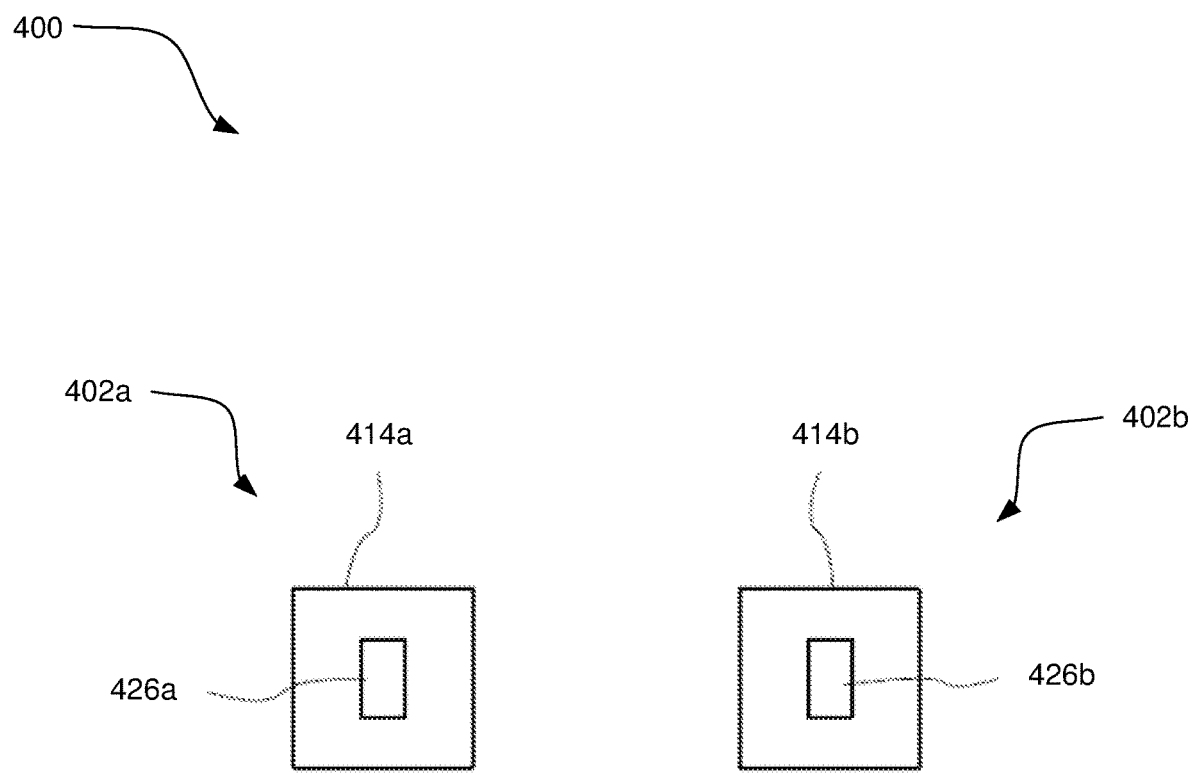
FIG. 5 illustrates a top view of metal center conductors and outer conductors of a coaxial waveguide within a single ridge waveguide to dual-coaxial waveguide transition.

FIG. 5 illustrates a top view of a device 400 comprising metal center conductors (426a, 426b) and metal outer conductors (414a, 414b) of dual-coaxial waveguides 402a, 402b in a single ridge waveguide to dual-coaxial waveguide transition, also shown in FIG. 4. FIG. 5 illustrates a first coaxial waveguide 402a that comprises an inner conductor 426a and an outer conductor 414a. The figure further illustrates a second coaxial waveguide 402b including an inner conductor 426b and an outer conductor 414b.

As shown in FIG. 5, a top of inner conductor 426a and a top of inner conductor 426b are disposed within outer conductors 414a and 414b of the coaxial waveguides 402a and 402b, and are rectangularly shaped, although other shapes are possible, as discussed above. As discussed above with respect to FIG. 4, the first coaxial waveguide 402a and the second coaxial waveguide 402b may be rotated by 90 degrees, as desired, to allow a coaxial radiating element connected to the device 400 to operate in the E-plane or the H-plane based on the requirements of a particular application.

The coaxial waveguides 402a, 402b may be sized to match to a radiating element coaxial geometry. The air volume (represented in FIG. 5 as the space between the inner and outer conductors of coaxial the waveguides 402a, 402b may be sized to provide impedance match between an antenna element and transition region inside the waveguide.

Figure 6:
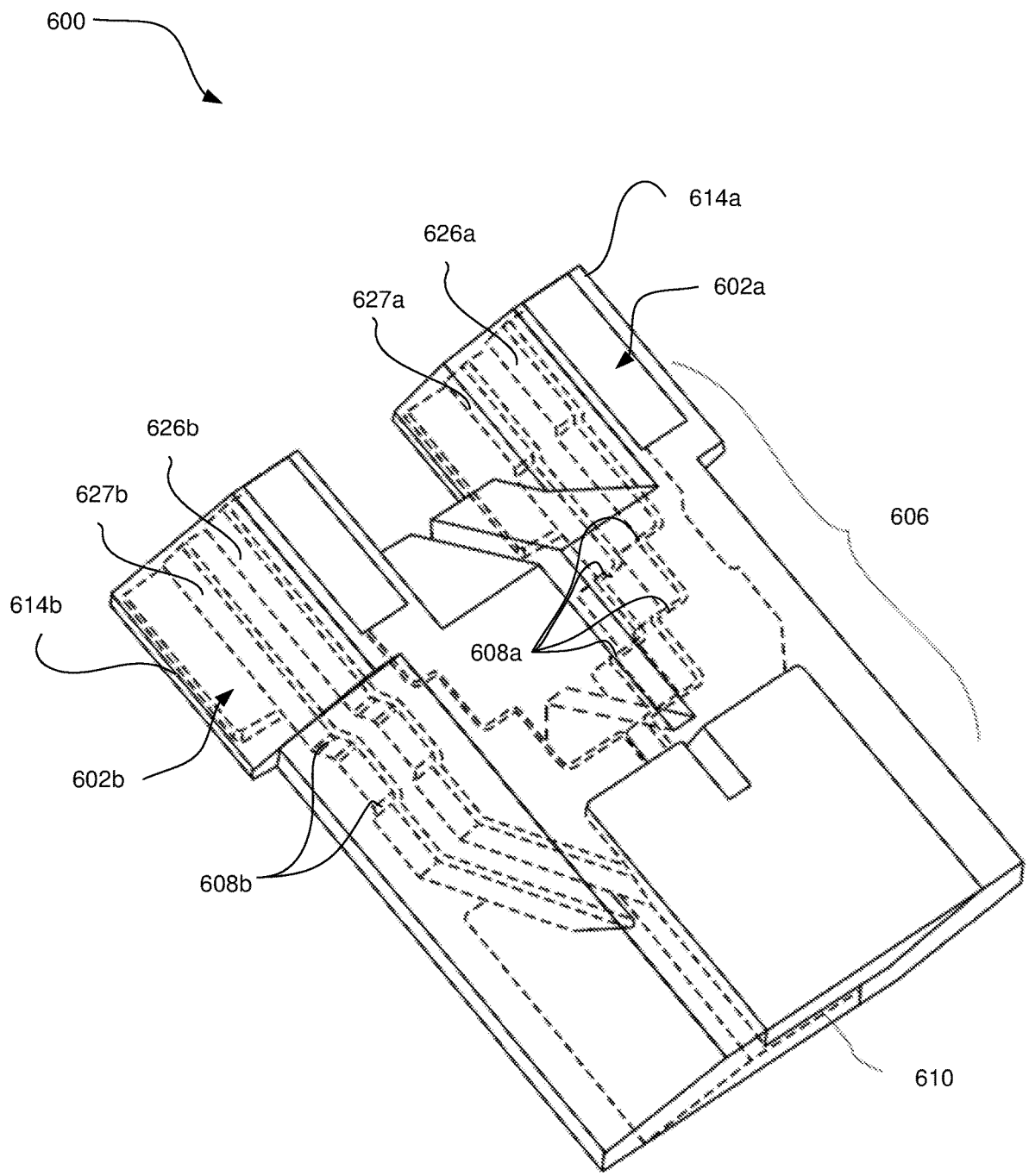
FIG. 6 illustrates a perspective view of a dual-ridge waveguide to dual twin-wire balanced coaxial waveguide transition.

FIG. 6 illustrates an isometric view of a device 600 comprising a hollow dual-ridge waveguide to dual twin-wire balanced coaxial waveguides. The device 600 essentially provides a direct conversion and power split from a hollow dual ridge waveguide $TE_{10}$ mode into a balanced twin-wire coaxial mode.

The device 600 includes three metal conductors for each of the two twin-wire balanced coaxial waveguides (e.g., two balanced inner conductors and one outer conductor in each twin-wire balanced coaxial waveguide arrangement). The first coaxial waveguide 602a includes a first inner conductor 626a and a second inner conductor 627a enclosed by the outer conductor 614a body of the twin-wire balanced coaxial waveguide. The second coaxial waveguide 602b includes a first inner conductor 626b and a second inner conductor 627b enclosed by the outer conductor 614b body of the twin-wire balanced coaxial waveguide. The device 600 may further include an impedance transition 606, which is similar in implementation and description to the transition 106, shown in FIG. 1 and including (and duplicating) impedance elements. The device 600 further includes a hollow dual ridge waveguide port 610.

Figure 7:
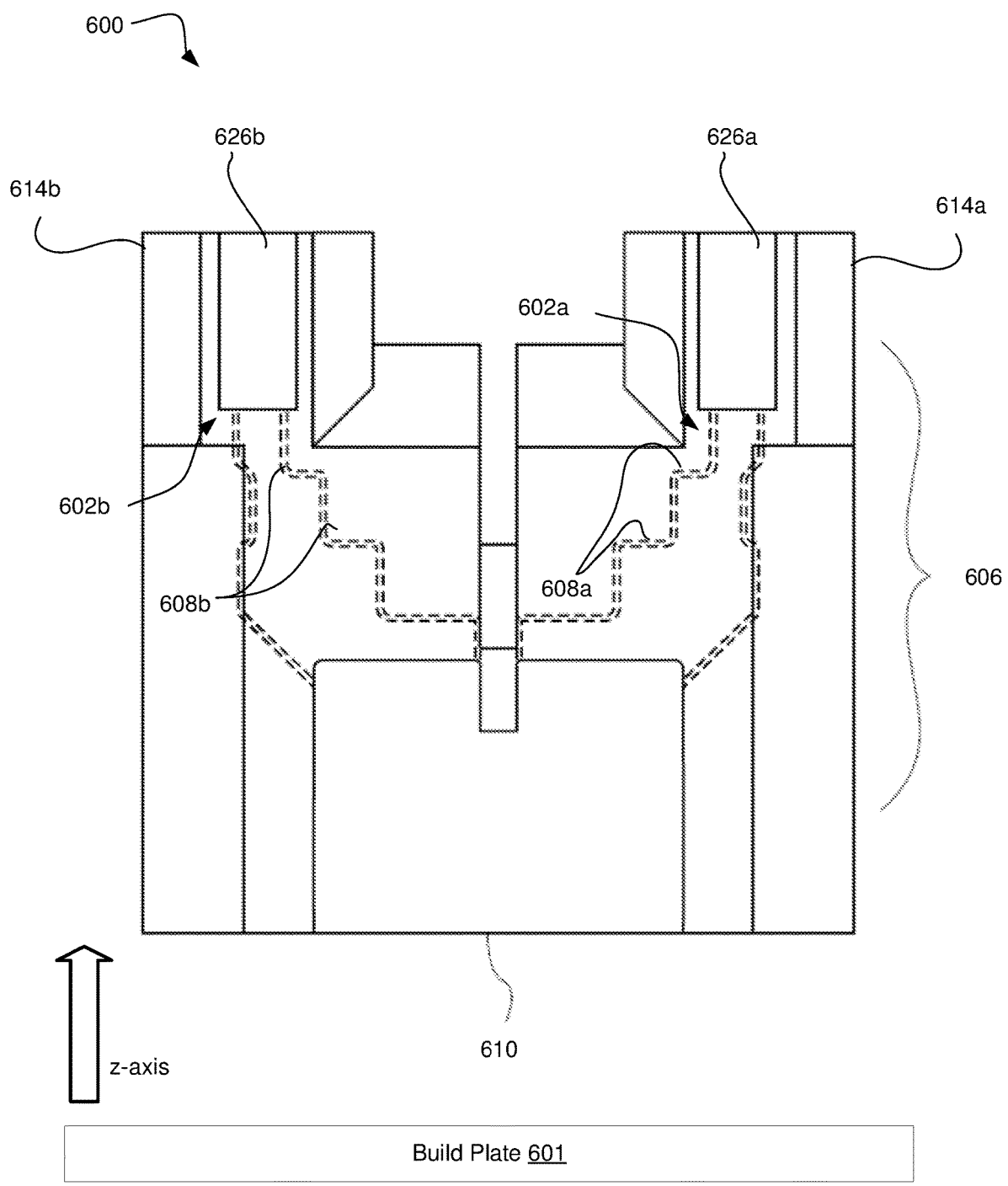
FIG. 7 illustrates a cross-sectional view of a dual-ridge waveguide to dual twin-wire balanced coaxial waveguide transition.

FIG. 7 illustrates a cross-sectional view of a device 600 comprising a hollow dual-ridge waveguide to dual twin-wire balanced coaxial ports, also shown in FIG. 6. The device 600 essentially provides a direct conversion and power split from a hollow dual ridge waveguide $TE_{10}$ mode into a balanced twin-wire coaxial mode, only one side of which is shown due to the perspective of FIG. 7, in a single device 600 to make the device 600 a hollow dual-ridge waveguide to dual twin-wire balanced coaxial waveguide transition.

Accordingly, the device 600 includes four inner metal conductors (e.g., a dual twin-wire arrangement). The device includes a first coaxial waveguide 602a including a first inner conductor 626a and a second inner conductor 627a. The device includes a second coaxial waveguide 602b including a first inner conductor 626b and a second inner conductor 627b. The second inner conductors 627a, 627b are not shown due to the cross sectional view of FIG. 7. The outer conductors 614a, 614b for the balanced twin-wire coaxial waveguide are provided by the external body of device 600. The device 600 may further include an impedance transition 606, which is similar in implementation and description to the transition 406, shown in FIG. 4 and including (and duplicating) impedance elements 408a and 408b. The device 600 further includes a hollow waveguide port 610.

The device 600 may be constructed with metal additive manufacturing (i.e., metal three-dimensional printing). The device 600 may be constructed upward relative to a build plate 601, wherein the z-axis for purposes of metal additive manufacturing is orthogonal to the plane of the build plate 601, as shown in FIG. 7. The device 600 may be designed to ensure all overhang angles are oriented for an additive manufacturing process. The device 600 may be manufactured with metal additive manufacturing in a positive z-axis direction relative to a build plate. In this case, the entire device 600, including at least the waveguide port 610, the coaxial waveguides 602a, 602b, the transition 606, the impedance elements 608a, 608b the outer conductors 614a, 614b, and the first and second inner conductors 626a, 626b, 627a, 627b constitutes a single indivisible element manufactured with metal additive manufacturing, and further such that manufacturing of the device 600 does not require a separate joining process for joining separate components.

Figure 8:
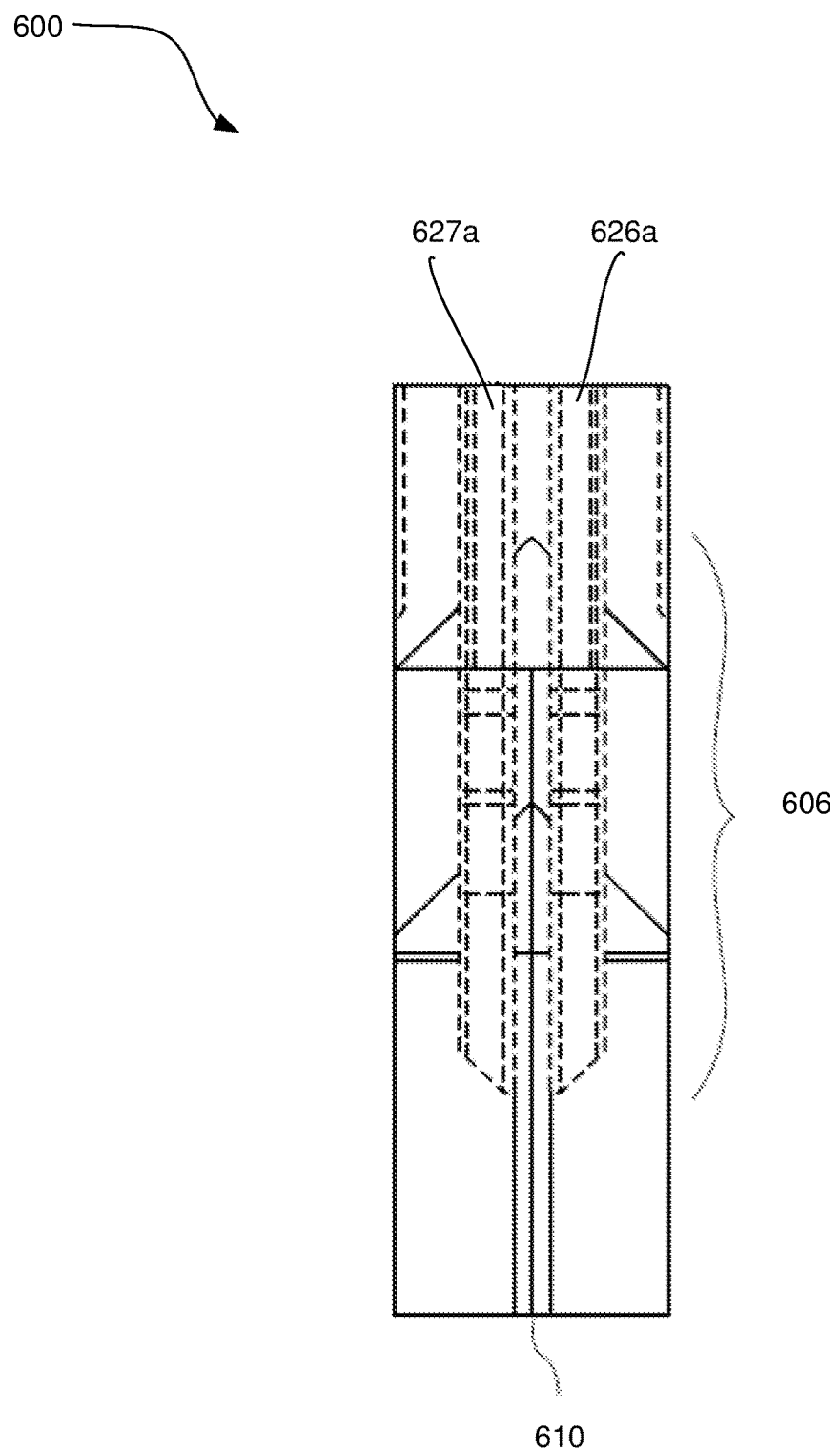
FIG. 8 illustrates a side view of a dual-ridge waveguide to dual twin-wire balanced coaxial waveguide transition.

FIG. 8 illustrates a side view of a device 600 comprising a hollow dual-ridge waveguide to dual twin-wire balanced coaxial waveguide, also shown in FIG. 6. The device 600 essentially provides a direct conversion and power split from a hollow dual ridge waveguide $TE_{10}$ mode into a balanced twin-wire coaxial mode. Accordingly, the device 600 includes four metal inner conductors (e.g., a dual twin-wire arrangement).

The first coaxial waveguide 602a includes a first inner conductor 626a and a second inner conductor 627a. The second coaxial waveguide 602b is not illustrated due to the perspective of FIG. 8. However, the first inner conductor 626a and the second inner conductor 627a of the first coaxial waveguide 602a are seen as discrete individual conductors for a balanced twin-wire coaxial waveguide. The device 600 may further include an impedance transition 606, which is similar in implementation and description to the transition 406, shown in FIG. 4 and including (and duplicating) impedance elements 408a and 408b. The device 600 further includes a hollow waveguide port 610.

Figure 9:
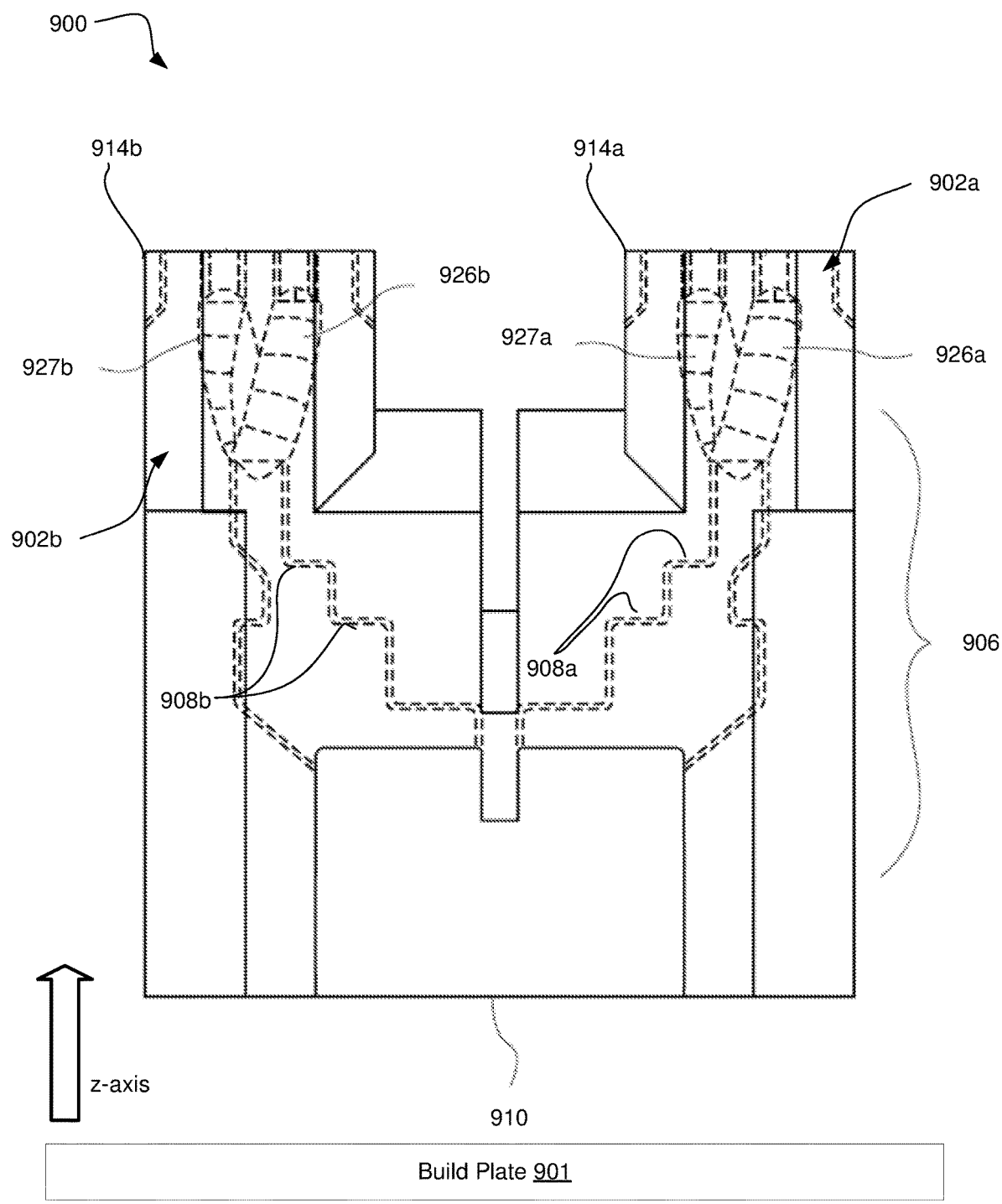
FIG. 9 illustrates a cross sectional view of a dual-ridge waveguide to dual twin-wire balanced helical coaxial waveguide transition with a helical twist coaxial wire waveguide.

FIG. 9 illustrates a cross sectional view of a device 900 comprising a hollow dual-ridge waveguide to dual twin-wire balanced coaxial waveguide with a helical twist twin-wire coaxial waveguide. FIG. 9 and the other figures herein are illustrated such that the dotted lines represent solid components (may be constructed of metal), and non-dotted lines represent the outline of negative space. In FIG. 9, for example, the dotted lines represent coaxial wire within the waveguide that is oriented with a helical twist. The solid lines represent the outline of a solid component that is not illustrated, such that the space between a dotted line and a solid line represents negative space wherein air can pass through.

The device 900 essentially provides a direct conversion and power split from a hollow dual ridge waveguide $TE_{10}$ mode into a balanced twin-wire coaxial mode, including a helical twist in the balanced coaxial twin-wire waveguide to reorient the balanced twin wire orientation to align with a twin-wire fed radiating element.

Accordingly, the device 900 includes four metal inner conductors which are oriented within the device 900 with a helical 90-degree twist. The device 900 includes a first coaxial waveguide 902a and a second coaxial waveguide 902b. The first coaxial waveguide 902a includes twin wires in a helical twist formation, wherein the twin wires constitute the first inner conductor 926a and the second inner conductor 927a surround by the outer conductor 914a. Similarly, the second coaxial waveguide 902b includes twin wires in a helical twist formation, wherein the twin wires constitute the first inner conductor 926b and the second inner conductor 927b surround by the outer conductor 914b.

The twin wires in the helical twist formations (i.e., the inner conductors of the coaxial waveguides) are disposed between the impedance transition 906. The device 900 includes the impedance transition 906, which is similar in implementation and description to the transition 406, shown in FIG. 4 and including (and duplicating) impedance elements 408a and 408b. The device 900 further includes a hollow waveguide port 910.

The orientation of the conductor wires is determined based on the cross-sectional geometry of the wire. The cross-sectional geometry may be rectangular, square, elliptical, circular, or some other geometric shape. The orientation of the cross-sectional geometry of the conductor wire may be changed from a first end (at the impedance transition 906 region) to a second end (distal from the impedance transition 906 region). In an implementation as illustrated in FIG. 9, the orientation of the conductor wire at the second end is orthogonal relative to the orientation of the conductor wire at the first end. In this case, the helical twist formation causes the conductor wire to twist until its orthogonal to itself.

The device 900 may be constructed with metal additive manufacturing (i.e., metal three-dimensional printing). The device 900 may be constructed upward relative to a build plate 901, wherein the z-axis for purposes of metal additive manufacturing is orthogonal to the plane of the build plate 901 as shown in FIG. 9. The device 900 may be designed to ensure all overhang angles are oriented for an additive manufacturing process. The device 900 may be manufactured with metal additive manufacturing such that the entire device 900, including at least the waveguide port 910, the coaxial waveguides 902a, 902b, the transition 906, the impedance elements 908a, 908b the outer conductors 914a, 914b, and the inner conductors 926a, 926b constitutes a single indivisible element manufactured with metal additive manufacturing, and further such that manufacturing of the device 900 does not require a separate joining process for joining separate components.

Figure 10:
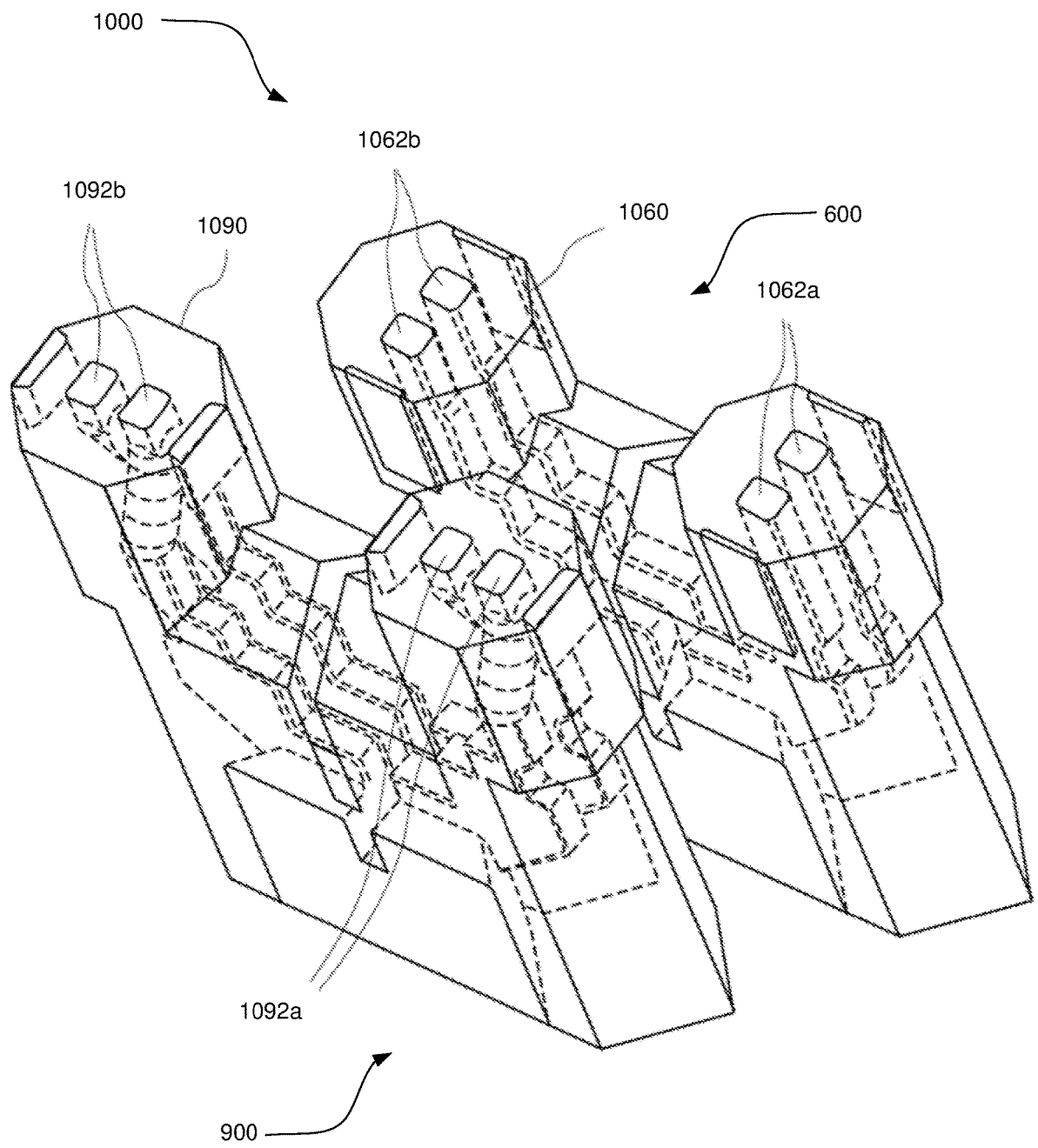
FIG. 10 illustrates a perspective view of two dual-ridge waveguide to dual twin-wire balanced coaxial waveguide with a helical twist coaxial wire waveguide at an orthogonal reorientation of the twin coaxial wire.

FIG. 10 illustrates a perspective view of a device 1000 comprising two hollow dual-ridge waveguide to dual twin-wire balanced coaxial waveguide transitions wherein the transition is similar in implementation and description to the device 600 as first illustrated in FIG. 6, and similar in implementation and description to the device 900 as first illustrated in FIG. 9. The device 1000 essentially includes the device 600 illustrated in FIG. 6 and the device 900 illustrated in FIG. 9.

The device 1000 includes the dual twin-wire balanced coaxial waveguide (see 600) illustrated in FIG. 6 and further includes the dual twin-wire balanced coaxial waveguide with a helical twist twin-wire coaxial waveguide (see 900) illustrated in FIG. 9. The helical twist coaxial twin-wire waveguide of the transition 1090 from device 900 orients the twin-wire balanced coaxial waveguide ports of the transition 1090 from device 900 at an orthogonal orientation relative to the twin-wire balanced coaxial waveguide ports of the transition 1060 from device 600. The transitions 1060, 1090 from devices 600 and 900 are combined into a single antenna array element to generate device 1000.

The pair of waveguides in each of devices 600 and 900 support two orientations of twin wire coaxial for feeding dual-polarized antenna array elements which are fed by a twin-wire balanced coaxial waveguide. The helical twist of the inner conductors within the coaxial waveguide allows for reorientation of the twin wire coaxial to align with the orientation of the twin-wire balanced antenna radiating element.

As shown in FIG. 10, twin-wire inner conductor pairs 1062a and 1062b are similarly oriented. The conductor pairs 1092a and 1092b, however, are oriented similarly to each other but orthogonal to conductor pairs 1062a and 1062b. The orientation of the conductor pairs is determined based on the cross-sectional orientation of the wire. In an implementation wherein the conductor wires comprise a cross-sectional rectangular geometry (as illustrated in FIG. 10), the orientation of the conductor wires is determined based on the long-side (or short-side) orientation of the cross-sectional rectangle. The cross-sectional rectangular geometry of the transition 1060 conductors or orthogonal relative to the cross-sectional rectangular geometry of the transition 1090 conductors.

Accordingly, the transitions 1060 and 1090 may each operate in one of an E-plane and an H-plane while also feeding a dual-polarization antenna array comprised of twin-wire balanced coaxial radiating elements. The helical twists implemented on conductor pairs 1092a and 1092b allow appropriate orientation or reorientation of twin-wire balanced coaxial waveguide fed antenna radiating elements and facilitate a dual polarization broadband antenna array.

The device 1000 may be manufactured with metal additive manufacturing such that the entire device 1000 constitutes a single indivisible element manufactured with metal additive manufacturing, and further such that manufacturing of the device 1000 does not require a separate joining process for joining separate components.

Figure 11:
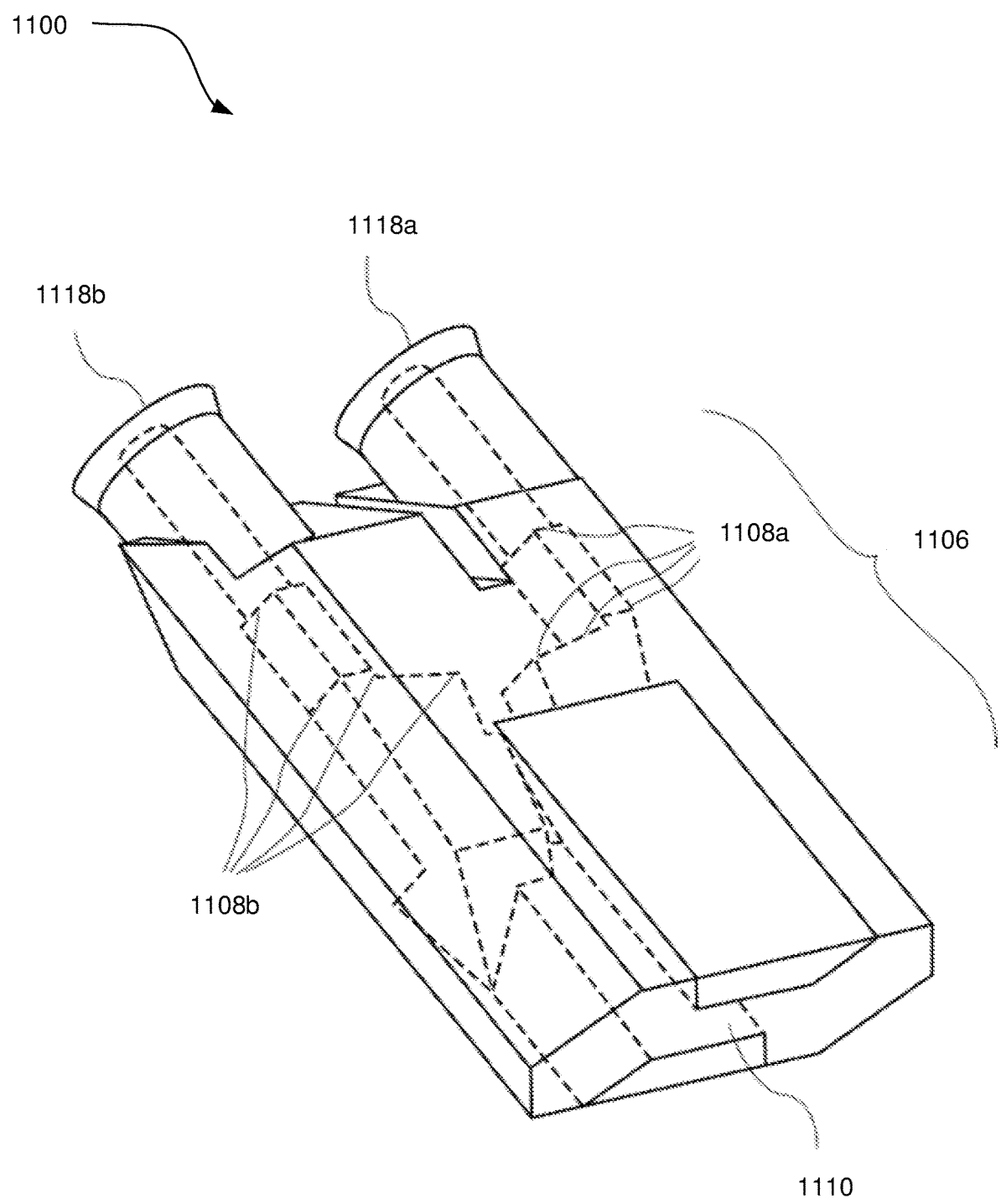
FIG. 11 illustrates a perspective view of a dual-ridge waveguide to dual-coaxial waveguide output transition.

FIG. 11 illustrates an isometric view of a device 1100 comprising a hollow dual-ridge waveguide to dual circular coaxial waveguide output. The device 1100 includes a first circular coaxial waveguide 1118a and a second circular coaxial waveguide 1118b (e.g., a cross section of the coaxial waveguide outer conductor and inner conductor are circular) as shown in FIG. 11. It should be noted that the cross-sectional geometry of the inner conductor(s) disposed within the coaxial waveguide need not be the same cross-sectional geometry of other components of the waveguide. For example, the coaxial waveguide may have an elliptical cross-sectional geometry while the one or more inner conductors disposed within the coaxial waveguide have a rectangular cross-sectional geometry.

The first and second circular coaxial waveguides 1118a, 1118b may each be directly connected to a coaxial-fed antenna element. The device 1100 may further include an impedance transition 1106 which serves to match the impedance of the device 1100 to other waveguide components and to the coaxial input/output requirements. The transition 1106 also acts as a power combiner or divider depending on which direction an electromagnetic wave is being propagated (e.g., being received or being transmitted). The impedance transition 1106 may include impedance matching elements 1108a and 1108b which may include indents, outdents, steps with rounded corners, a first and second taper of each ridge of a dual ridge waveguide to support the transition to a coaxial waveguide, and other features which serve to match the impedance of the impedance transition 1106 to a hollow waveguide or to a coaxial waveguide. It is also to be noted that impedance matching elements 1108a and 1108b may further be matched to each other on opposing sides of the device 1100 (e.g., be symmetric or mirror images of each other). The device 1100 may further include a hollow waveguide port 1110.

The device 1100 may be manufactured with metal additive manufacturing such that the entire device 1100 constitutes a single indivisible element manufactured with metal additive manufacturing, and further such that manufacturing of the device 1100 does not require a separate joining process for joining separate components.

Figure 12:
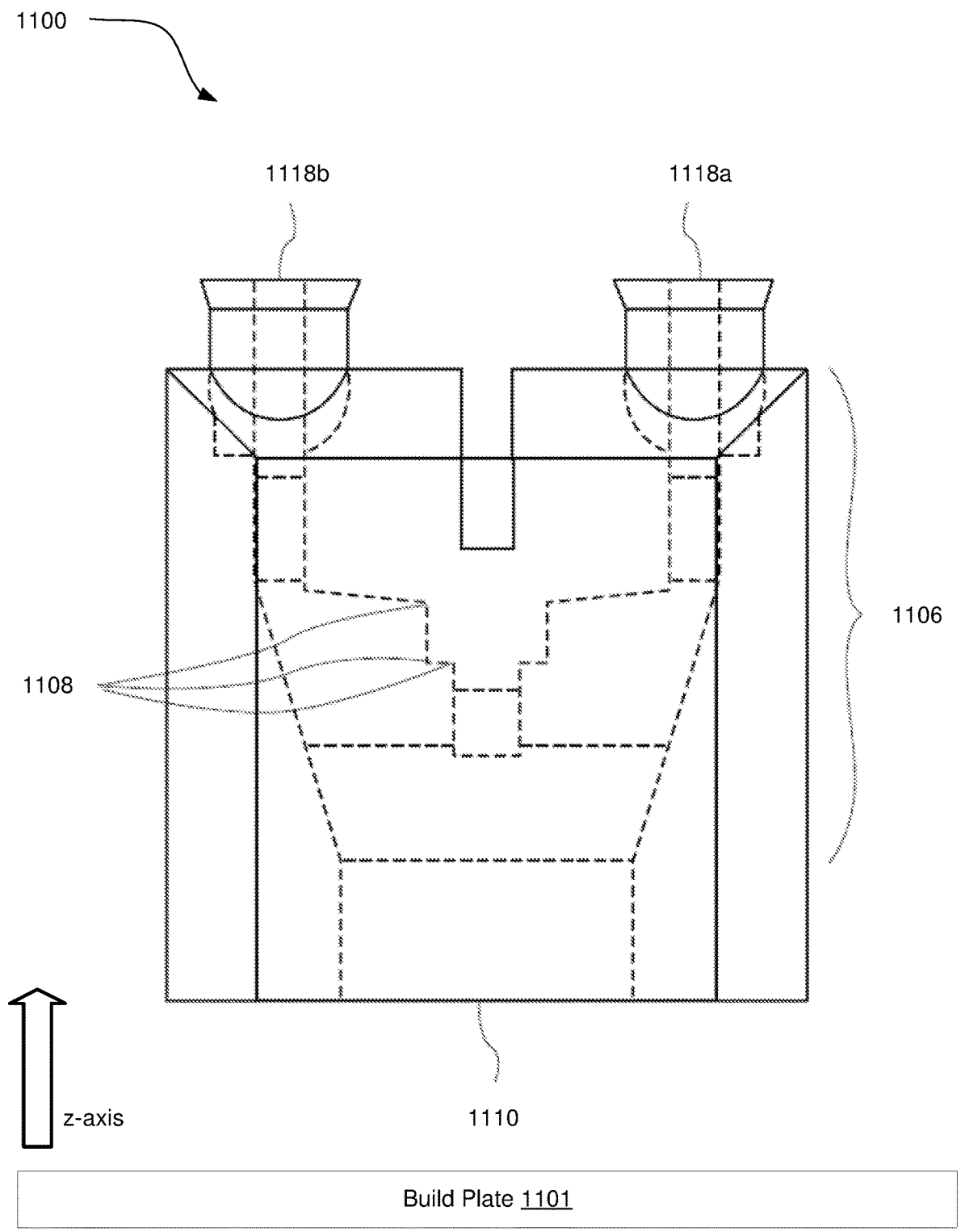
FIG. 12 illustrates cross-sectional view of a dual-ridge waveguide to dual coaxial waveguide output transition.

FIG. 12 illustrates cross-sectional view of a device 1100 comprising a dual-ridge waveguide to dual circular coaxial waveguide output, also shown in FIG. 11. The device 1100 may include a first and second circular coaxial waveguide 1118a, 1118b (e.g., a cross section of the coaxial waveguide outer conductor and inner conductor are circular) as shown in FIG. 11. The first and second circular coaxial waveguide 1118a, 1118b may each be connected to a coaxial-fed antenna element. The device 1100 may further include an impedance transition 1106 which serves to match the impedance of the device 1100 to other waveguide components and to the coaxial waveguide input/output requirements. The transition 1106 also acts as a power combiner or divider depending on which direction an electromagnetic wave is being propagated (e.g., being received or being transmitted). The impedance transition 1106 may include impedance matching elements 1108 which may include indents, outdents, steps with rounded corners, a first and second taper of each ridge of a dual ridge waveguide to support the transition to a coaxial waveguide, and other features which serve to match the impedance of the impedance transition 1106 to a hollow dual ridge waveguide or to a coaxial waveguide. It is also to be noted that impedance matching elements 1108 may further be matched to each other on opposing sides of the device 1100 (e.g., be symmetric or mirror images of each other). The device 1100 may further include a hollow waveguide port 1110.

The device may be constructed with metal additive manufacturing (i.e., metal three-dimensional printing). The device may be constructed upward relative to a build plate 1101, wherein the z-axis for purposes of metal additive manufacturing is orthogonal to the plane of the build plate 1101. The device may be designed to ensure all overhang angles are oriented for an additive manufacturing process.

Figure 13:
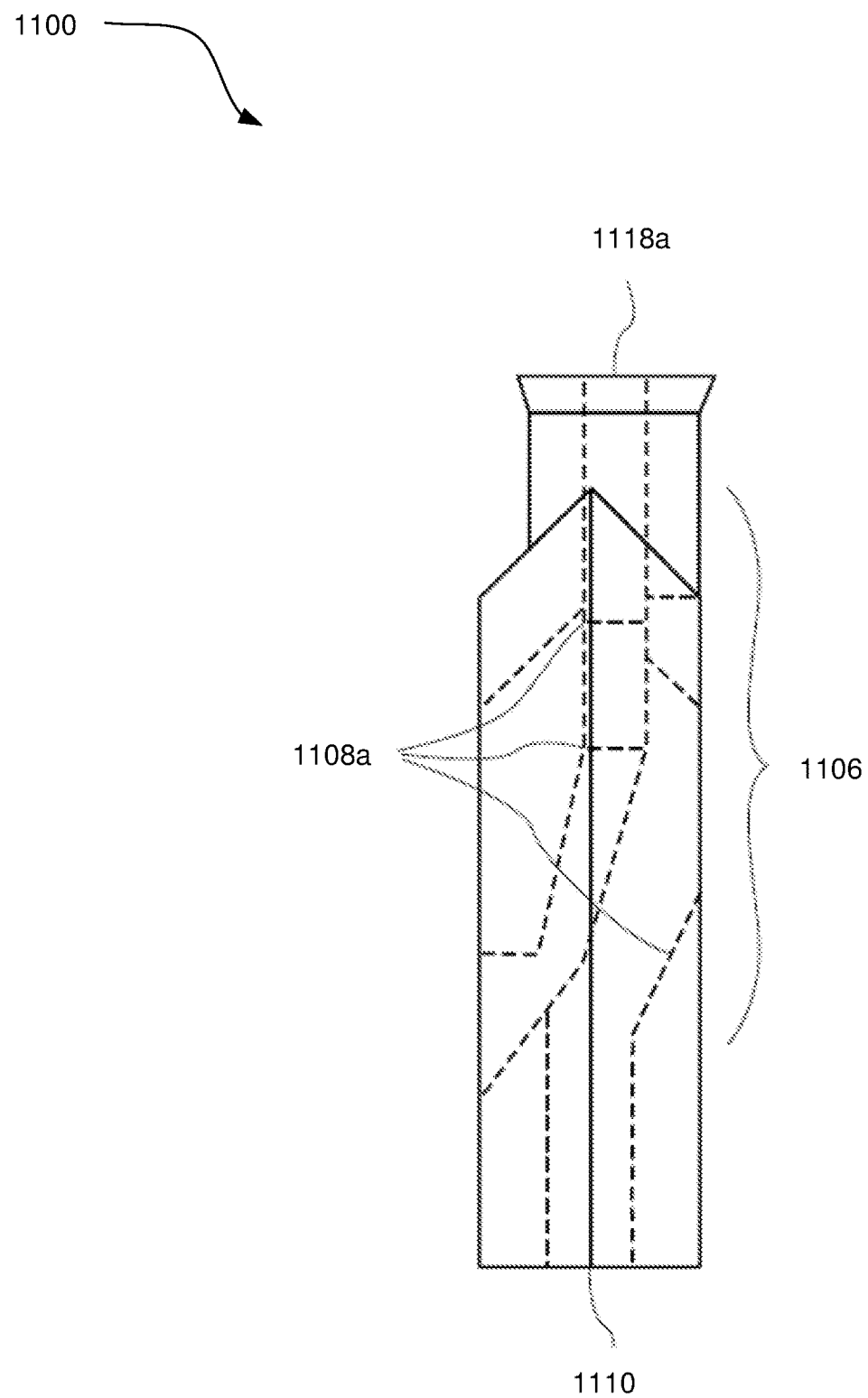
FIG. 13 illustrates a side view of a dual-ridge waveguide to dual coaxial waveguide output transition.

FIG. 13 illustrates a side view of a device 1100 comprising a hollow dual-ridge waveguide to dual circular coaxial waveguide output. The device 1100 may include a circular coaxial waveguide 1118a (e.g., a cross section of the coaxial waveguide outer conductor and inner conductor are circular) as shown in FIG. 11. The circular coaxial waveguide 1118a may be connected to a coaxial fed antenna array element. The second circular coaxial waveguide 1118b is not visible in FIG. 13 due to perspective. The device 1100 may further include an impedance transition 1106 which serves to match the impedance of the hollow dual ridge waveguide to the dual circular coaxial waveguide. The transition 1106 also acts as a power combiner or divider depending on which direction an electromagnetic wave is being propagated (e.g., being received or being transmitted). The impedance transition 1106 may include impedance matching elements 1108a and 1108b which may include indents, outdents, steps with rounded corners, a first and second taper of each ridge of a dual ridge waveguide to support the transition to a coaxial waveguide, and other features which serve to match the impedance of the impedance transition 1106 to a hollow waveguide or to a coaxial waveguide input/output. It is also to be noted that impedance matching elements 1108a and 1108b may further be matched to each other on opposing sides of the device 1100 (e.g., be symmetric or mirror images of each other). The device 1100 may further include a hollow waveguide port 1110.

Figure 14:
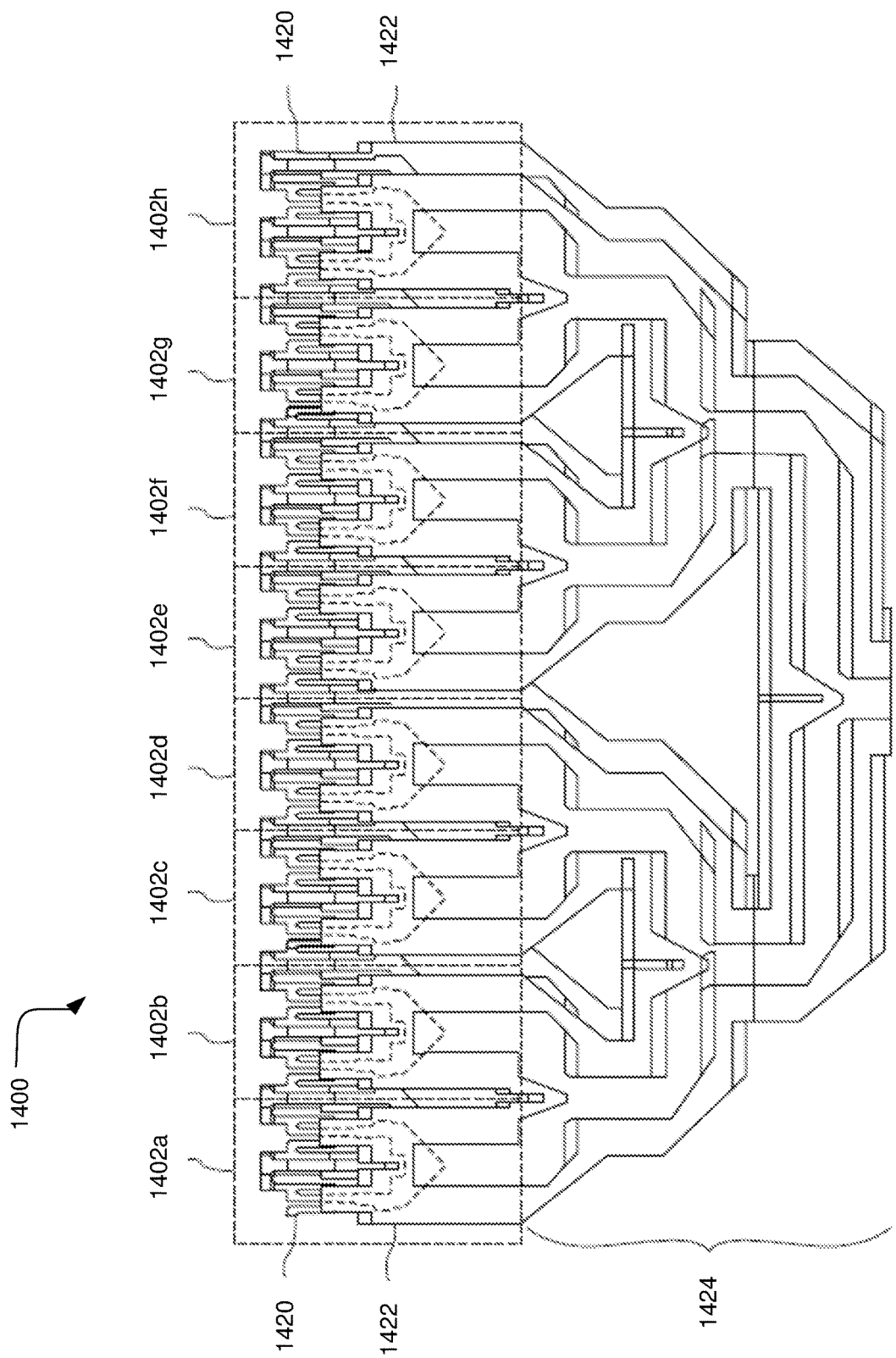
FIG. 14 illustrates a side view of an antenna array element and corporate combiner which incorporates a set of branched single ridge waveguide combiners to dual-coaxial waveguide transitions in a combiner/divider antenna element.

FIG. 14 illustrates a side view of an antenna array 1400 comprising a single combined row of an antenna array which incorporates a number of coaxial-fed antenna elements connected to the coaxial waveguide of the device 400 at 402a and 402b shown in FIG. 4, above, followed by a hollow single-ridge waveguide combiner network connected to single ridge waveguide port. FIG. 14 is an example of a waveguide combiner network attached to a waveguide-to-coaxial transition and a coaxial-fed radiating element with broad bandwidth. In an implementation, the element spacing is 0.5 wavelengths at the highest frequency, and this allows for electronic scanning in the y-axis direction (not illustrated, axis orthogonal to the plane of the figure or in the direction into and out of the image). FIG. 14 illustrates two rows of combiners feeding into a dual-polarized antenna element.

It is noted, for purposes of description that the transition may be implemented on side of antenna array 1400, that is not visible due to perspective in FIG. 14. As shown in FIG. 14, a plurality of the transitions 1402a, 1402b, 1402c, 1402d, 1402e, 1402f, 1402g, 1402h are disposed on a combiner divider antenna element. Each one of transitions 1402a-1402h includes a coaxial-fed antenna radiating element 1420 and an impedance transition 1422. The plurality of transitions 1402a-1402h may further be connected by a series of hollow waveguide power combiners/dividers 1424 in a hollow waveguide combiner network. Also, as shown in FIG. 14, two rows of combiners (antenna elements 1400) are provided which feed a dual-polarized antenna element with each row of antenna elements operating in the E-plane or H-plane, as desired. As shown herein, a spacing between coaxial waveguide ports allows for antenna element spacing that is less than or equal to one wavelength of the working frequency of the antenna array and allows for an electronic scan in the direction orthogonal to the row over a wide bandwidth with spacing less than half a wavelength of the working frequency of the antenna array.

In an implementation, the antenna array is implemented with pairs of transitions that may have different components or orientations. For example, an antenna array may be manufactured that includes a pair of transitions from devices 100 and 400 illustrated herein; or a pair of transitions from devices 100 and 600 illustrated herein; or a pair of transitions from devices 100 and 900 illustrated herein; or a pair of transitions from devices 100 and 1100 illustrated herein. Any of the transition devices illustrated herein, including devices 100, 400, 600, 900, and 1100 may be paired with one another in any suitable combination. Additionally, same devices may be paired with one another such that an antenna array may include a pair of identical or mirror-image devices 1100 illustrated in FIG. 11. The device pairs may be selected to ensure that the coaxial waveguide ports are oriented in the desired direction. Accordingly, because the device 1100 is symmetrical, a pair of transitions may include two identical or mirror-image devices 1100. In another implementation, an antenna array may include a pair of devices include device 600 and device 900 as illustrated in FIG. 10. The transition embodiments may be selected based on whether the transition has asymmetries that use the rotation to achieve orientation with the radiating element.

The device 1400 may be manufactured with metal additive manufacturing such that the entire device 1400 constitutes a single indivisible element manufactured with metal additive manufacturing, and further such that manufacturing of the device 1400 does not require a separate joining process for joining separate components.

Figure 15:
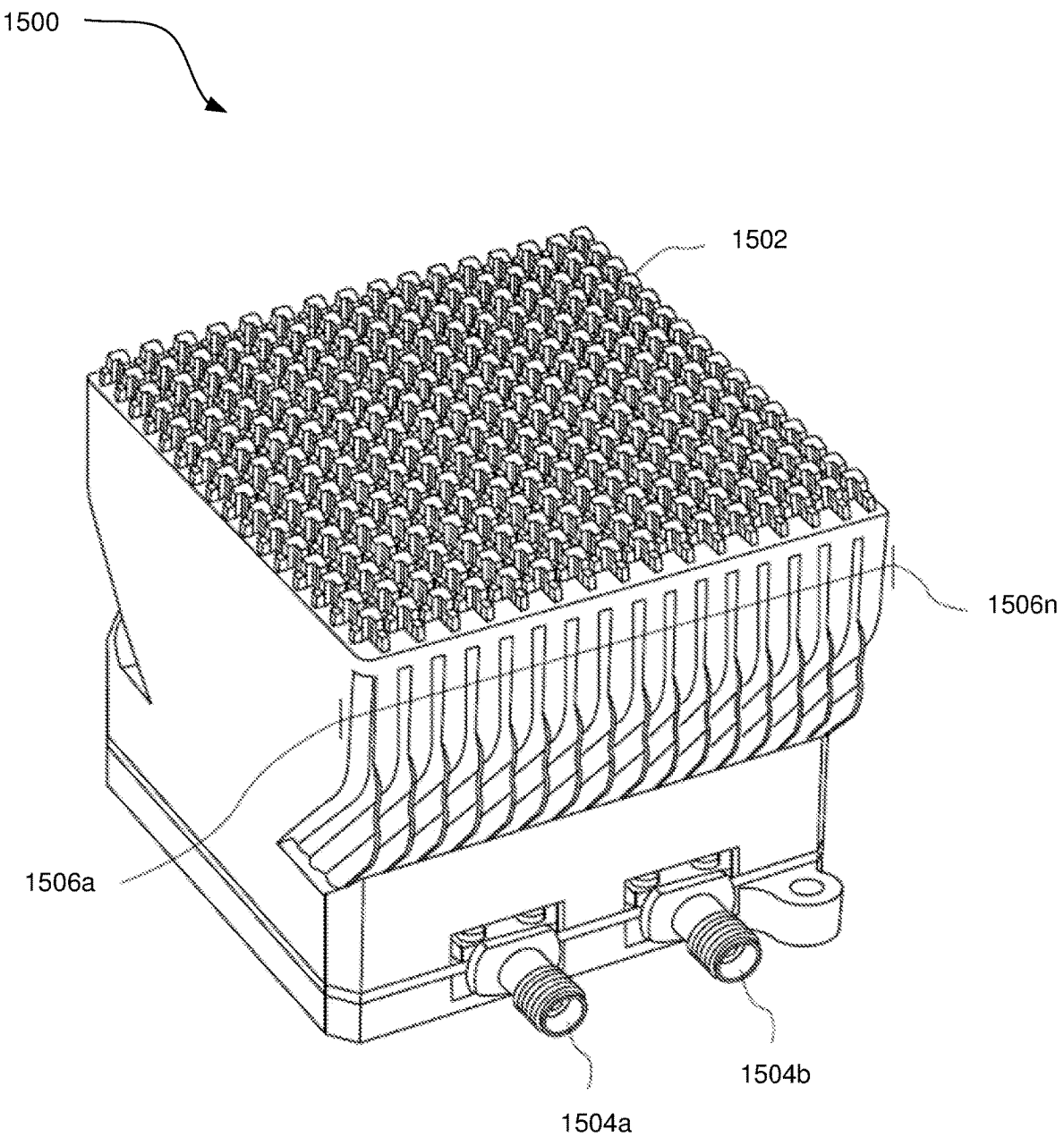
FIG. 15 illustrates fabricated dual-polarized array with combiner network and integrated transition from ridge waveguide to coaxial-fed antenna element at each combiner/divider antenna element.

FIG. 15 illustrates fabricated dual-polarized array 1500 with combiner network and integrated transition from ridge waveguide to coaxial waveguide at each combiner/divider antenna element. In an implementation, the spacing of the antenna elements allows for electronic scan in a single axis. The broad bandwidth of radiating elements allows for multi-band operation.

The array 1500 may incorporate the above mentioned waveguide elements, disclosed herein. For example, the array 1500 may include a plurality of radiating elements 1502 and coaxial inputs 1504a, 1504b. The array 1500 may further include a plurality of combiners (antenna elements 1400 as shown in FIG. 14 as representations of air volume) in a chassis produced by metal additive manufacturing techniques, as antenna elements 1506a through 1506n. The array 1500 may include any number of antenna elements 1506a through 1506n. The array 1500 may be a dual-polarized array which incorporates a broad bandwidth radiating element for multi-band operation.

EXAMPLES

The following examples pertain to further embodiments.

Example 1 is a device. The device includes a hollow waveguide port; two or more coaxial waveguide ports; and a transition disposed between the waveguide port and the two or more coaxial waveguide ports, wherein the transition combines or divides electromagnetic energy.

Example 2 is a device as in Example 1, wherein the transition combines or divides the electromagnetic energy based on a direction of the electromagnetic energy propagating through the device, and wherein: the transition combines the electromagnetic energy propagating from the two or more coaxial waveguide ports through the transition to the hollow waveguide port; and the transition divides the electromagnetic energy propagating from the hollow waveguide port through the transition to the two or more coaxial waveguide ports.

Example 3 is a device as in any of Examples 1-2, wherein the transition is an impedance transition and comprises one or more impedance matching elements.

Example 4 is a device as in any of Examples 1-3, wherein the transition is an impedance transition and comprises a plurality of impedance matching elements, and wherein two or more of the plurality of impedance matching elements are mirror images of one another.

Example 5 is a device as in any of Examples 1-4, wherein the hollow waveguide port is configured to connect to a hollow waveguide configured to propagate the electromagnetic energy.

Example 6 is a device as in any of Examples 1-5, wherein the two or more coaxial waveguide ports are spaced apart from one another with spacing less than or equal to one wavelength of a working frequency.

Example 7 is a device as in any of Examples 1-6, wherein the two or more coaxial waveguide ports are spaced apart from one another with spacing less than or equal to 0.5 wavelengths of the working frequency to allow for an electronic scan over a bandwidth.

Example 8 is a device as in any of Examples 1-7, wherein at least one of the two or more coaxial waveguide ports comprises a rectangular geometry for either the inner conductor or the outer conductor.

Example 9 is a device as in any of Examples 1-8, wherein at least one of the two or more coaxial waveguide ports comprises an elliptical geometry for either the inner conductor or the outer conductor.

Example 10 is a device as in any of Examples 1-9, wherein at least one of the two or more coaxial waveguide ports comprises a twin-wire balanced coaxial waveguide port for feeding a twin-wire balanced antenna array radiating element.

Example 11 is a device as in any of Examples 1-10, wherein the twin-wire balanced coaxial waveguide port comprises coaxial twin-wire in a helical twist formation.

Example 12 is a device as in any of Examples 1-11, wherein the two or more coaxial waveguide ports comprise an orthogonal offset of the inner conductor relative to one another such that a first coaxial inner conductor is oriented in a first orientation and a second coaxial inner conductor is oriented in a second orientation, wherein the second orientation is orthogonal to the first orientation.

Example 13 is a device as in any of Examples 1-12, wherein at least one of the two or more coaxial waveguide ports comprises two inner conductor wires and a helical transition wherein the two inner conductor wires comprise a helical twist formation.

Example 14 is a device as in any of Examples 1-13, wherein the helical transition rotates the two inner conductor wires to an orthogonal orientation.

Example 15 is a device as in any of Examples 1-14, further comprising a hollow dual ridge waveguide, wherein the hollow dual ridge waveguide comprises a taper to support transition of the electromagnetic energy from the hollow dual ridge waveguide to the transition.

Example 16 is a device as in any of Examples 1-15, wherein the transition comprises an offset such that the transition operates in one or more of an E-plane or an H-plane.

Example 17 is a device as in any of Examples 1-16, wherein the transition is constructed of metal using metal additive manufacturing.

Example 18 is a device as in any of Examples 1-17, wherein the two or more coaxial waveguide ports are configured to receive the electromagnetic energy from a radiating element of an antenna, and wherein the transition is configured to transition the electromagnetic energy from the radiating element of the antenna to a low loss passive hollow waveguide combiner.

Example 19 is a device as in any of Examples 1-18, wherein the transition is configured to transition the electromagnetic energy from a TE10 mode of a hollow single ridge waveguide or a hollow dual ridge waveguide to a transverse electromagnetic (TEM) mode of a coaxial waveguide.

Example 20 is a device as in any of Examples 1-19, wherein each of the hollow waveguide port, the two or more coaxial waveguide ports, and the transition is constructed with metal additive manufacturing techniques and comprises a single combined unit.

Example 21 is a device as in any of Examples 1-20, wherein the transition comprises an impedance transition area.

Example 22 is a device as in any of Examples 1-21, wherein the impedance transition area further performs a power split or power combination.

Example 23 is a device as in any of Examples 1-22, wherein at least one of the two or more coaxial waveguide ports comprises a single wire coaxial metal conductor with one of a rectangular or a circular geometry.

Example 24 is a device as in any of Examples 1-23, wherein the two or more coaxial waveguide ports are spaced apart from one another such that the spacing between the two or more coaxial waveguide ports is less than or equal to one wavelength of the working frequency of an antenna array.

Example 25 is a device as in any of Examples 1-24, further comprising an electronic scan comprising a spacing of radiating elements less than half of a wavelength of the working frequency of the antenna array.

Example 26 is a device as in any of Examples 1-25, further comprising a hollow single ridge waveguide.

Example 27 is a device as in any of Examples 1-26, further comprising a hollow dual ridge waveguide.

Example 28 is a device as in any of Examples 1-27, wherein the two or more coaxial waveguide ports are offset relative to one another by about 90 degrees.

Example 29 is a device as in any of Examples 1-28, wherein the two or more coaxial waveguide port inner conductors each comprise a helical shape.

Example 30 is a device as in any of Examples 1-29, wherein the transition comprises one or more impedance matching steps.

Example 31 is a device as in any of Examples 1-30, wherein the transition comprises one or more impedance tapers.

Example 32 is a device as in any of Examples 1-31, wherein the transition is formed by metal additive manufacturing techniques (i.e., three-dimensional metal printing).

Example 33 is a device as in any of Examples 1-32, wherein the transition is constructed of metal using metal additive manufacturing with a direction of growth over time in a positive z-axis relative to a build plate.

Example 34 is a device as in any of Examples 1-33, wherein the device comprises an overhang angle measured between two vectors originating from any point on a surface of the device, wherein the two vectors comprise: a vector perpendicular to the surface and pointing into air volume, and a vector pointing in a negative z-axis relative to the build plate; wherein the overhang angle is from zero degrees to ninety degrees.

Example 35 is an antenna assembly including a plurality of, any or all, the devices described in any of Examples 1-34 arranged in a combiner network.

Example 36 is an antenna assembly as in Example 35, further comprising one or more coaxial ports.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device comprising:
   a waveguide port;
   two or more coaxial waveguides; and
   a transition disposed between the waveguide port and the two or more coaxial waveguides, wherein the transition combines or divides electromagnetic energy;
   wherein the waveguide port, the two or more coaxial waveguides, and the transition is a single indivisible element manufactured with metal additive manufacturing in a positive z-axis direction relative to a build plate; and
   wherein the two or more coaxial waveguides are spaced apart from one another with spacing less than or equal to one wavelength of a working frequency of an antenna element.

2. The device of claim 1, wherein the transition combines or divides the electromagnetic energy based on a direction of the electromagnetic energy propagating through the device, and wherein:
   the transition combines the electromagnetic energy propagating from the two or more coaxial waveguides through the transition to the waveguide port; and
   the transition divides the electromagnetic energy propagating from the waveguide port through the transition to the two or more coaxial waveguides.

3. The device of claim 1, wherein the transition is an impedance transition and comprises one or more impedance matching elements.

4. The device of claim 1, wherein the transition is an impedance transition and comprises a plurality of impedance matching elements, and wherein two or more of the plurality of impedance matching elements are minor images of one another.

5. The device of claim 1, wherein the waveguide port is a hollow waveguide port and is configured to connect to a hollow waveguide configured to propagate the electromagnetic energy.

6. The device of claim 1, wherein the device comprises an overhang angle measured between two vectors originating from any point on a surface of the device, wherein the two vectors comprise:
   a vector perpendicular to the surface and pointing into an air volume; and a
   vector pointing in a negative z-axis relative to the build plate;
   wherein the overhang angle is from zero degrees to ninety degrees.

7. The device of claim 1, wherein the two or more coaxial waveguides are spaced apart from one another with spacing less than or equal to 0.5 wavelengths of the working frequency of the antenna element to allow for an electronic scan over a working bandwidth.

8. The device of claim 1, wherein at least one of the two or more coaxial waveguides comprises an inner conductor and/or an outer conductor with a rectangular cross-sectional geometry.

9. The device of claim 1, wherein at least one of the two or more coaxial waveguides comprises an inner conductor and/or an outer conductor with an elliptical cross-sectional geometry.

10. The device of claim 1, wherein at least one of the two or more coaxial waveguides comprises a twin-wire balanced coaxial waveguide inner conductor for feeding a twin-wire balanced coaxial radiating element, wherein the twin-wire balance coaxial radiating element is a component of the antenna element.

11. The device of claim 10, wherein the twin-wire balanced coaxial waveguide inner conductor comprises a twin coaxial wire in a helical twist formation.

12. The device of claim 1, wherein the two or more coaxial waveguides are orthogonal relative to one another such that a first coaxial waveguide port is oriented in a first orientation and a second coaxial waveguide port is oriented in a second orientation, and wherein the second orientation is orthogonal to the first orientation.

13. The device of claim 1, wherein at least one of the two or more coaxial waveguides comprises two inner conductor wires, and wherein the two inner conductor wires comprise a helical twist formation.

14. The device of claim 13, wherein the helical twist formation of the two inner conductor wires rotates the two inner conductor wires to an orthogonal orientation such that a first end of the two inner conductor wires is orthogonal relative to a second end of the two inner conductor wires.

15. The device of claim 1, further comprising a hollow dual ridge waveguide in electromagnetic communication with the waveguide port and the transition, wherein the hollow dual ridge waveguide comprises a taper to support transition of the electromagnetic energy from the hollow dual ridge waveguide to the transition.

16. The device of claim 1, wherein the transition operates in one or more of an E-plane or an H-plane of a radiating element, wherein the radiating element is a component of the antenna element.

17. The device of claim 1, wherein the two or more coaxial waveguides are configured to receive the electromagnetic energy from a radiating element of the antenna element, and wherein the transition is configured to transition the electromagnetic energy from the radiating element of the antenna element to a low loss passive hollow waveguide combiner.

18. A device comprising:
a waveguide port;
two or more coaxial waveguides; and
a transition disposed between the waveguide port and the two or more coaxial waveguides, wherein the transition combines or divides electromagnetic energy;
wherein the transition is configured to transition the electromagnetic energy from a TE10 mode of a hollow ridge waveguide to a transverse electromagnetic (TEM) mode of the two or more coaxial waveguides.

19. The device of claim 18, wherein the hollow ridge waveguide is a hollow single ridge waveguide.

20. The device of claim 18, wherein the hollow ridge waveguide is a hollow dual ridge waveguide.

21. The device of claim 18, wherein the waveguide port, the two or more coaxial waveguides, and the transition is a single indivisible element manufactured with metal additive manufacturing in a positive z-axis direction relative to a build plate.

* * * * *